United States Patent
Gupta et al.

(10) Patent No.: US 12,323,473 B2
(45) Date of Patent: *Jun. 3, 2025

(54) BREAKOUT OF PARTICIPANTS IN A CONFERENCE CALL

(71) Applicant: Adeia Guides Inc., San Jose, CA (US)

(72) Inventors: Vikram Makam Gupta, Karnataka (IN); Madhusudhan Seetharam, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,847

(22) Filed: Dec. 13, 2023

(65) Prior Publication Data

US 2024/0171620 A1 May 23, 2024

Related U.S. Application Data

(63) Continuation of application No. 17/634,000, filed on Jun. 30, 2021, now Pat. No. 11,882,161.

(51) Int. Cl.
*H04L 65/401* (2022.01)
*G06F 16/683* (2019.01)
(Continued)

(52) U.S. Cl.
CPC ........ *H04L 65/4015* (2013.01); *G06F 16/685* (2019.01); *G06F 40/35* (2020.01); *G06Q 10/105* (2013.01); *G06Q 10/109* (2013.01); *G06V 40/174* (2022.01); *G06V 40/20* (2022.01); *H04L 12/1822* (2013.01); *H04L 12/1831* (2013.01); *H04L 65/1069* (2013.01); *H04L 65/1093* (2013.01); *H04M 3/568* (2013.01); *H04M 2201/40* (2013.01)

(58) Field of Classification Search
CPC ............ H04L 65/4015; H04L 65/1093; H04M 3/568; H04M 2201/40
USPC ........................................................ 379/88.01
See application file for complete search history.

(56) References Cited

U.S. PATENT DOCUMENTS

| 10,237,405 B1 * | 3/2019 | Neuer, III ........... H04M 3/5175 |
| 2004/0062363 A1 * | 4/2004 | Shambaugh ............ H04M 3/51 379/88.01 |

(Continued)

*Primary Examiner* — Amal S Zenati
(74) *Attorney, Agent, or Firm* — Haley Guiliano LLP

(57) ABSTRACT

Systems and methods for creating and managing a breakout conference for a primary conference are disclosed. The system monitors communications between participants of a primary conference to determine if a) participants have a disagreement that needs to be resolved or b) if a topic from the meeting agenda requires additional time for discussion. Participant language, including negations and repetitive word usage, job profiles, body language, overlapping voice signals, among other factors, are monitored to determine if a disagreement exists. If a disagreement exists or additional time is required, the system automatically creates a virtual breakout session, determines the topic that created the disagreement, determines participants associated with the disagreed topic, and moves them to the breakout session. The system also provides meeting tools such that participants in the primary conference may communicate and alert participants in the breakout session, and vice versa, without leaving their respective sessions.

20 Claims, 13 Drawing Sheets

(51) Int. Cl.
*G06F 40/35* (2020.01)
*G06Q 10/105* (2023.01)
*G06Q 10/109* (2023.01)
*G06V 40/16* (2022.01)
*G06V 40/20* (2022.01)
*H04L 12/18* (2006.01)
*H04L 65/1069* (2022.01)
*H04L 65/1093* (2022.01)
*H04M 3/56* (2006.01)

(56) References Cited

U.S. PATENT DOCUMENTS

| | | | |
|---|---|---|---|
| 2013/0195260 A1* | 8/2013 | Barsoba | H04L 65/403 |
| | | | 379/88.14 |
| 2016/0337510 A1* | 11/2016 | Li, I | G10L 25/60 |
| 2017/0353605 A1* | 12/2017 | Dumaine | G06V 40/176 |
| 2022/0086393 A1* | 3/2022 | Peters | H04N 7/147 |
| 2023/0007063 A1 | 1/2023 | Gupta et al. | |

* cited by examiner

| Natural Language Processing Engine | Artificial Intelligence Engine | External Resources |
|---|---|---|
| What is the temperature used for the test | - Thermal Test<br>- Topic of the agenda | Dictionary DB |
| Its 400 degrees F | - Temperature<br>- Thermal test | |
| We need to test next week | - Scheduling<br>- Thermal Test | |
| That will not work | - Negation<br>- Thermal testing scheduling | |

FIG. 7B

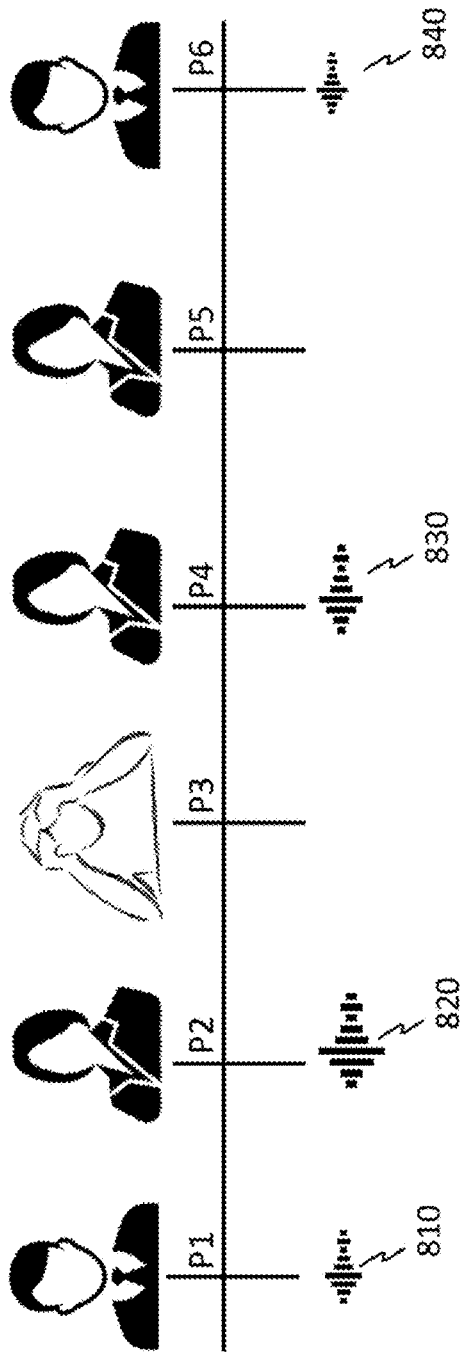

Topic: The product should be priced at $50 USD.

| Participant | Agree / Disagree | Conflict Score | Total Sentiment |
|---|---|---|---|
| P1 | Agree | +1 | +1 |
| P2 | Disagree | -1 | 0 |
| P1 | Agree | +1 | +1 |
| P3 | Disagree | -1 | 0 |
| P2 | Disagree | -1 | -1 |
| P2 | Disagree | -1 | -2 |

| Meeting Tools | Approve | Reject |
|---|---|---|
| 1110 — Record primary/breakout session? | | |
| 1120 — Summarize primary/breakout session? | | |
| 1130 — Communicate with primary/breakout session participants? | | |
| 1140 — Track primary/breakout session progress? | | |
| 1150 — Activate timer in primary/breakout session? | | |
| 1160 — Receive alerts from primary/breakout session? | | |
| 1170 — Add new participant to the primary/breakout session? | | |
| 1180 — Send automated updates from breakout session to primary conference? (Updates, Summary, Progress) | | |

BREAKOUT OF PARTICIPANTS IN A CONFERENCE CALL

CROSS-REFERENCE TO RELATED APPLICATION

This application is a continuation of U.S. patent application Ser. No. 17/364,000, filed Jun. 30, 2021, the disclosure of which is hereby incorporated by reference herein in its entirety.

FIELD OF INVENTION

Embodiments of the present disclosure relate to creating and managing a breakout conference for a primary conference. They also relate to monitoring communications between participants of the primary conference to determine if a) participants have a disagreement that relates to a topic of the meeting or b) if a topic from the meeting agenda requires additional time for discussion, and if so, automatically creating a breakout conference and moving participants associated with a topic of the disagreement from the primary conference to the breakout conference.

BACKGROUND

Conference calls are frequently used by individuals, groups, associations, and employees of various organizations. They are the backbone of a collaborative workplace, and when properly used, increase productivity and efficiency by allowing individuals to discuss various topics and develop solutions for moving forward in their respective roles and projects.

They are especially useful when the collaboration occurs among people who are geographically separated from one another and between employees that work remotely thereby alleviating or minimizing the need to meet physically for discussing a topic that can be discussed over a conference call. In more recent times, there has been an explosion of conference call activity, especially during the 2019-2021 years of the Covid-19 pandemic, during which a mass number of individuals worked remotely and had the need to connect with their colleagues over a conference call to accomplish their job duties.

Although conference calls can be a useful mechanism to discuss various issues, unfortunately, there exist several issues with current conferencing methods that result in unproductive meetings, or in some instances, a waste of time. Since conference calling has become more easy and common through a variety of online conferencing options, such as Zoom, Google Meet™, and Microsoft Teams™ individuals are spending more time than ever before on conference calls. (Google Meet is a trademark owned by Google LLC and Microsoft Teams is a trademark owned by Microsoft Corporation).

Some reasons for unproductive conferences include lack of preparation among participants and poorly defined objectives. Among the many reasons, one of the common reasons for an unproductive conference include a disagreement/conflict between participants that derails the meeting and requires all other participants to halt discussion of their meeting topic until the disagreement is resolved. In some instances, the disagreement persists throughout the conference and takes up much needed time that was allocated for other topics on the meeting agenda to be discussed thereby resulting in the other topics not being discussed or being pushed to a subsequently scheduled meeting and delaying progress.

As such, there is a need for a better conferencing system and method to increase productivity during conference calls, especially when a disagreement occurs between its participants.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 7B is depicts an exemplary process of applying natural language processing and artificial intelligence to determine a disagreement and the context of the disagreement based on a voice input, in accordance with some embodiments of the disclosure;

FIG. 8A is a block diagram of a plurality of participants in a primary conference and their voice signals, in accordance with some embodiments;

FIG. 8B is a table of voice signal received over a time period, in accordance with some embodiments;

FIG. 11 is an exemplary template of management and communication tools offered for selection to participants of either the breakout rooms or the primary conference, in accordance with some embodiments of the disclosure.

DETAILED DESCRIPTION

Figure 1A:
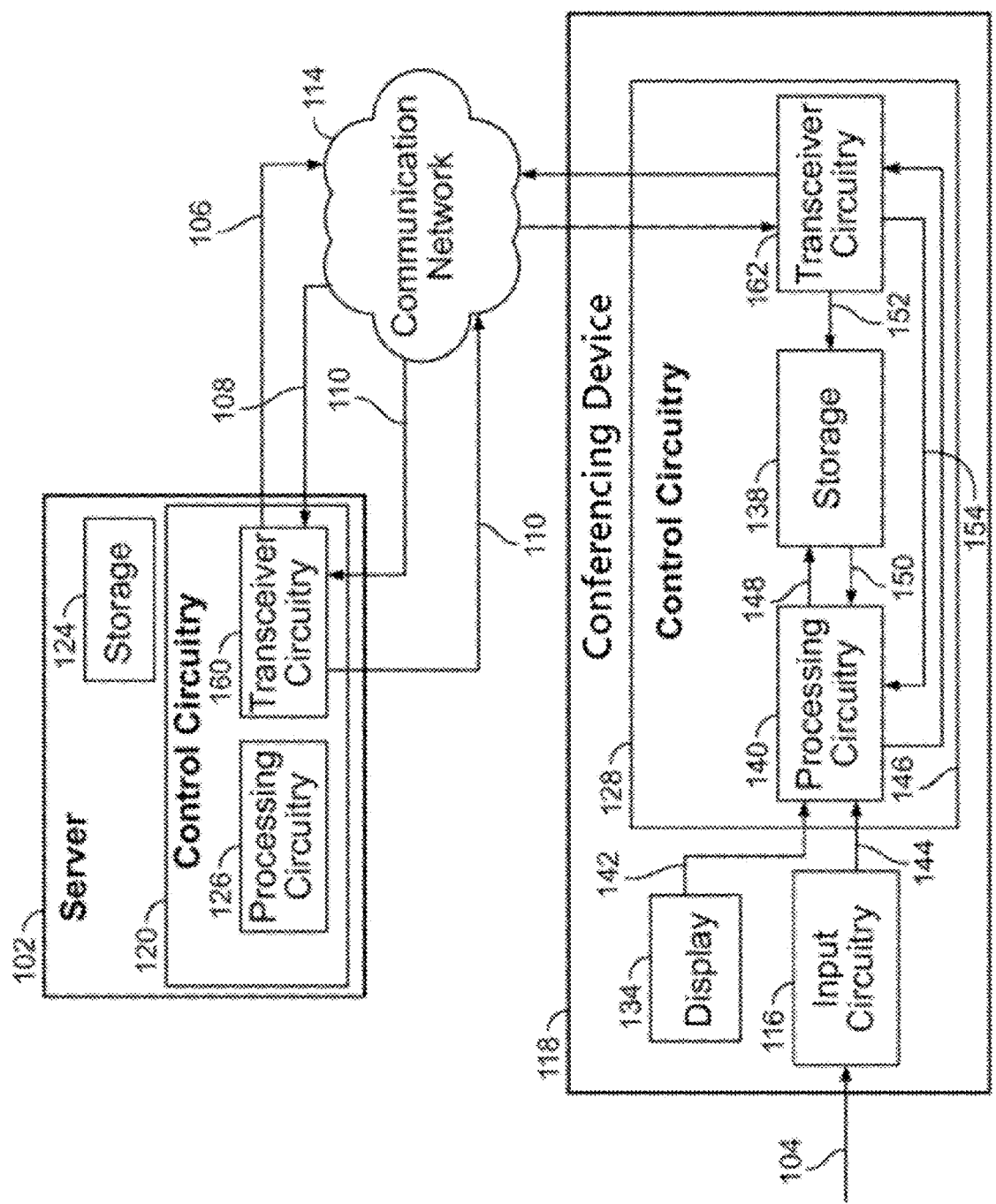
FIG. 1A is a block diagram of an exemplary system for creating and managing a primary and breakout conference, in accordance with some embodiments of the disclosure.

In accordance with some embodiments disclosed herein, the above-mentioned limitations are overcome by automatically creating a breakout conference for the primary virtual conference for topics that result in a disagreement or topics that require additional discussion. The system allocates a time for the virtual breakout conference such that issues relating to the disagreement may be resolved within the allotted time. Participants involved in the disagreement, and participants that are associated with the topic of disagreement, are automatically selected by the system and moved to the virtual breakout conference either automatically or upon acceptance of a selectable option to move.

In some embodiments, the method includes creating a primary conference and allowing a plurality of participants to join the primary conference. The primary conference, also referred to herein as main conference, main session, virtual conference, conference call, is a virtual conference calling session that may provide audio and/or video capabilities to its participants. The system obtains an agenda for the primary conference prior to its start time. The system uses the agenda to determine the topics to be covered in the primary conference and the amount of time allocated for each topic. In instances when an agenda is not available, or the topics for the agenda and allocated times are not available, then the system determines if historical data is available for a previous conference in which the same participants as the current primary conference attended the meeting. If so, to the extent discernable from the prior conference, the system uses an artificial intelligence algorithm to allocate amounts of time for each topic to be covered based on information gathered from the prior conference.

During the primary conference, the system monitors all conversations between participants. The conversations are converted to text using a natural language processing algorithm. The system determines if speech/statement made by a participant relates to a topic included in the meeting agenda. If so, the system associates the speech with a topic in the agenda and determines the context of the statement made. As referred to here, speech, voice signal, voice input, statement, and dialog refer to speech made by a participant during the conference.

The system then monitors all subsequent statements made during the primary conference to determine if any subsequent statements made by other participants also relate to the same topic. If the system determines that the subsequent statements made by another participant relates to the same topic, then the system determines if the subsequent statement contextually conflicts or disagrees with the earlier statement. If so, the system determines that the participants that made the statements may have a disagreement with respect to the topic and a separate virtual breakout conference may be needed to resolve the disagreement such that the primary conference can continue with disruption due to the disagreement and other topics on the agenda can be covered. As referred to herein, conflict, disagreement, frustration, opposing view, are used interchangeably and refer to a participant disagrees with a statement made by another participant.

Since one conflicting statement may not rise to the level of a disagreement, in some embodiments, the system concludes that a disagreement exists only after a threshold number of disagreeing statements are made by the other participants. For example, in some instances a participant may make a suggestion, which sounds like a disagreement, such as "you should also look into XYZ," and the participant is not persistently disagreeing. To avoid rushing into a breakout session without a disagreement, in some embodiments, the system may look for repeated disagreements to ensure that the disagreement warrants a separate breakout conference for resolution.

In other embodiments, the system uses various factors for determining if a disagreement exists. These factors include, determining if other participants' raise their voice at a high decibel levels, if the other participants' speech overlaps the participant speech who made the original statement, if the other participants' facial expressions, body language, tone, or behavior suggests a disagreement or frustration with the original statement, or if the job function of the other participant is such that their position is likely at odds with the job role and position of the participant who made the original statement and is likely to have a disagreement, and determination if the participants had a disagreement in previous meetings.

In other embodiments, a conflict score may be calculated. In this embodiment the system tracks the sentiment of the participants as the discussion in the primary conference progresses. If the sentiment reaches a negative conflict score that meets the negative sentiment threshold, then the system determines that a disagreement exists. Additional factors are described further in the application that may be used by the system to determine whether a disagreement exists.

Once a determination is made that a disagreement exists, the system automatically sets up a breakout conference that can be used by the participants that had the disagreement. The system seamlessly moves the participants involved in the disagreement, and any other participants that are associated with the topic of the disagreement, to the breakout conference. The move may be performed automatically or after the participants agree to the move.

As part of the move to the breakout conference, in some embodiments, the system accesses a human resources database to extract the profiles of each participant, their titles in the company, and their job roles. The system uses the profile information to designate a leader for the breakout conference (also referred to herein as breakout room, breakout session, secondary conference, and virtual breakout conference). For example, the system may select the participant with the senior most title or the participant that has ownership of the topic based on their job duties as the leader of the breakout conference.

While in the breakout conference, in some embodiments, the system provides communication and management tools to the participants of the breakout conference. The communication and management tools allow the participants to track progress of the primary conference without having to leave their breakout conference. The tools also allow the participants in the breakout conference to communicate with the participants in the primary conference, such as, to answer any questions that relate to a participant in the breakout conference or to the topic of discussion, and to provide a summary of their progress to the participants in the primary conference, without having to leave the breakout session.

Once the time allocated for the breakout conference ends, the participants in the breakout session are seamlessly and automatically integrated back into the primary conference without the participants having to execute any commands for moving back to the primary conference. By providing the breakout conference capability, and the ability to communicate between sessions, the system allows the primary conference to progress productively without a delay that may have been caused due to the disagreement.

Figure 1B:
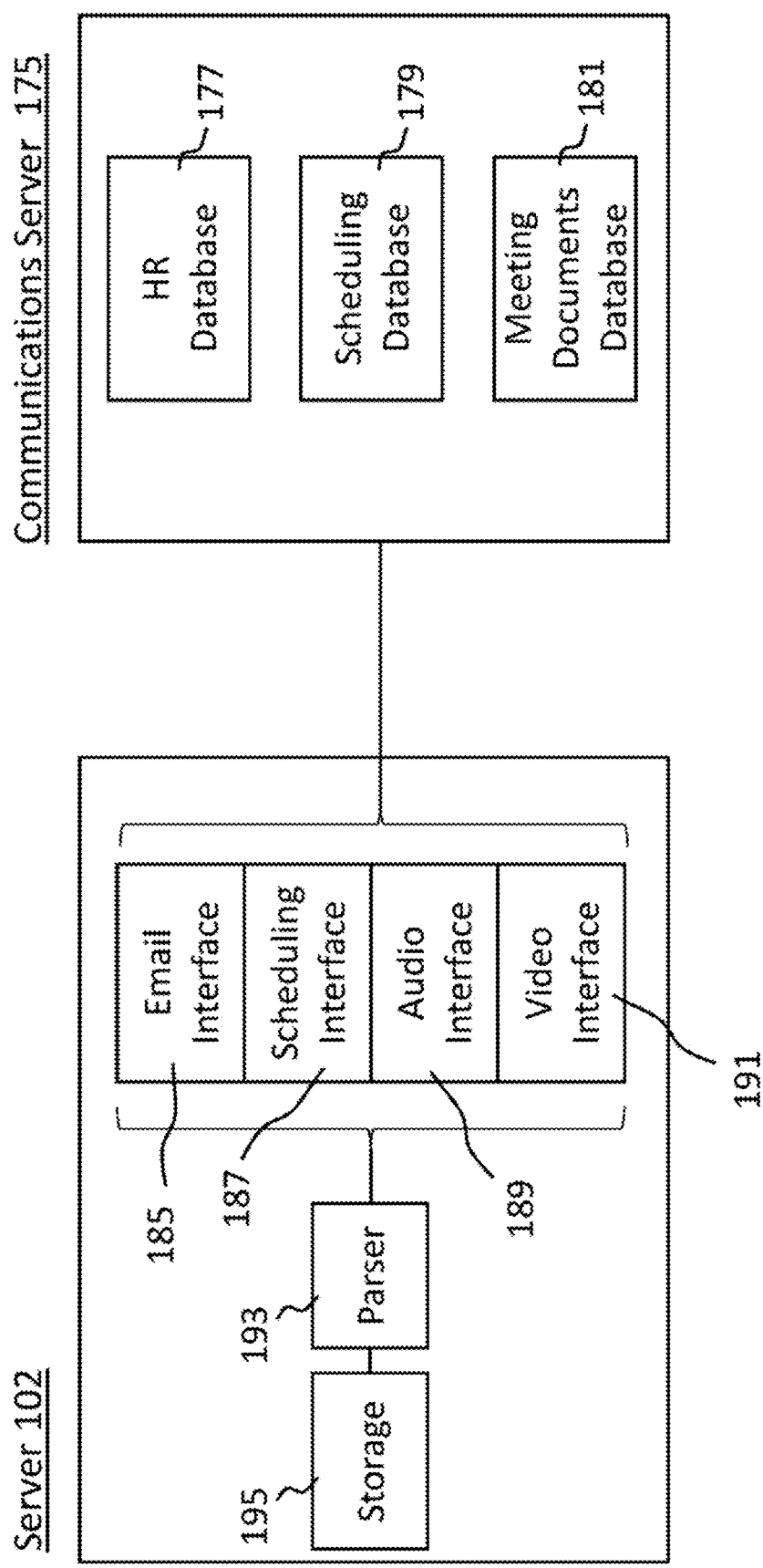
FIG. 1B is a block diagram of an exemplary conference calling system, in accordance with some embodiments of the disclosure.
Figure 2:
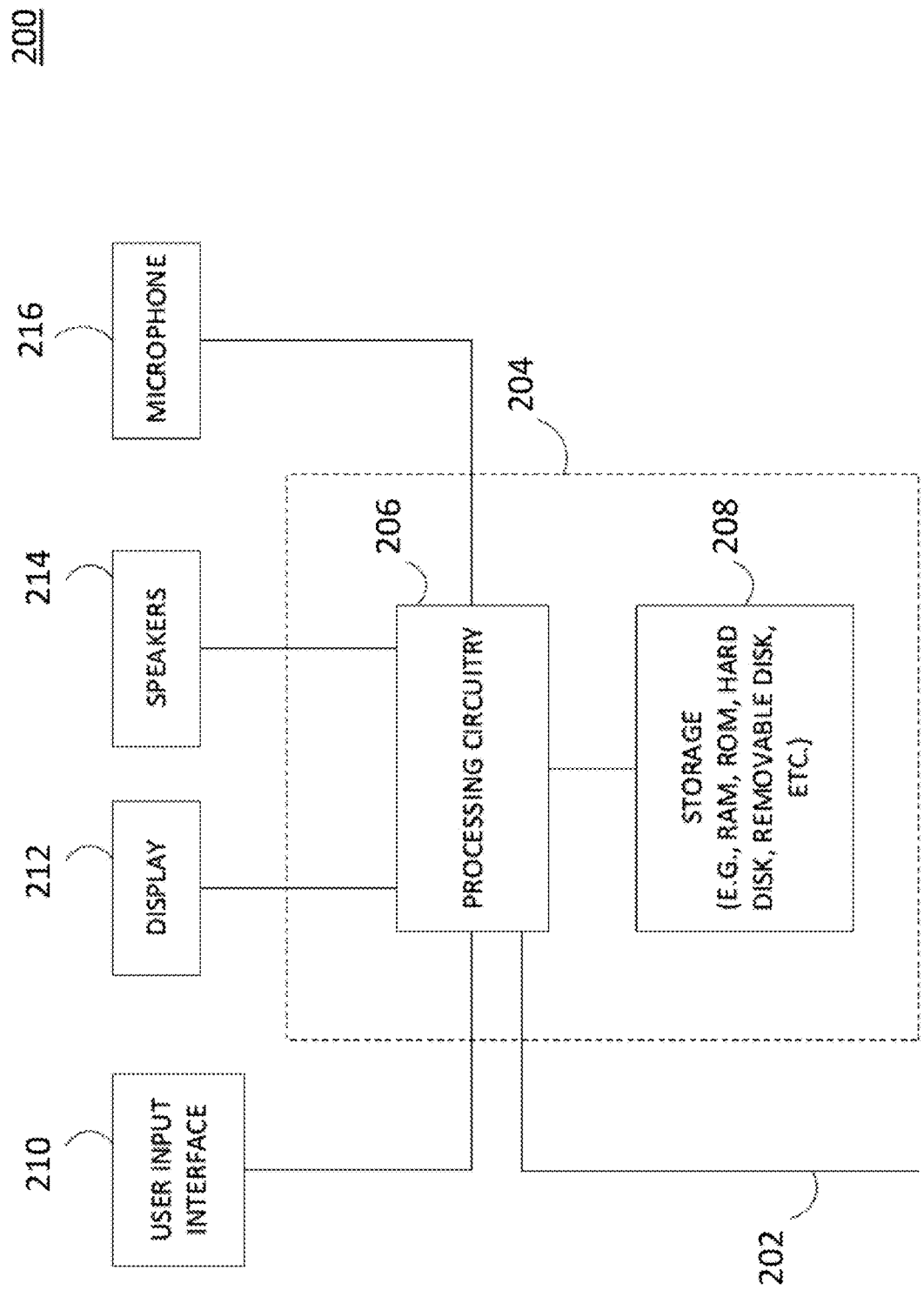
FIG. 2 is a block diagram of a conference device, in accordance with some embodiments of the disclosure.

FIGS. 1A, 1B, and 2 describe exemplary devices, systems, servers, and related hardware for creating and managing main/primary conference and virtual breakout conference sessions in accordance with some embodiments of the disclosure.

FIG. 1A is a block diagram of an exemplary system for creating and managing a primary and breakout conference, in accordance with some embodiments of the disclosure. In FIG. 1A, an audio/video conferencing system is configured as an audio/video conferencing system 100, in accordance with some embodiments of the disclosure. In an embodiment, one or more parts of or the entirety of system 100 may be configured as a system implementing various features, processes, and components of FIGS. 1-10. Although FIG. 1A shows a certain number of components, in various examples, system 100 may include fewer than the illustrated number of components and/or multiples of one or more of the illustrated number of components.

System 100 is shown to include a computing device 118, a server 102 and a communication network 114. It is understood that while a single instance of a component may be shown and described relative to FIG. 1A, additional instances of the component may be employed. For example, server 102 may include, or may be incorporated in, more than one server. Similarly, communication network 114 may include, or may be incorporated in, more than one communication network. Server 102 is shown communicatively coupled to computing device 118 through communication network 114. While not shown in FIG. 1A, server 102 may be directly communicatively coupled to computing device 118, for example, in a system absent or bypassing communication network 114.

Communication network 114 may comprise one or more network systems, such as, without limitation, an Internet, LAN, WIFI or other network systems suitable for audio processing applications. In some embodiments, system 100 excludes server 102, and functionality that would otherwise be implemented by server 102 is instead implemented by other components of system 100, such as one or more components of communication network 114. In still other embodiments, server 102 works in conjunction with one or more components of communication network 114 to implement certain functionality described herein in a distributed or cooperative manner. Similarly, in some embodiments, system 100 excludes computing device 118, and functionality that would otherwise be implemented by computing device 118 is instead implemented by other components of system 100, such as one or more components of communication network 114 or server 102 or a combination. In still other embodiments, computing device 118 works in conjunction with one or more components of communication network 114 or server 102 to implement certain functionality described herein in a distributed or cooperative manner.

Computing device 118 includes control circuitry 128, display 134 and input circuitry 116. Control circuitry 128 in turn includes transceiver circuitry 162, storage 138 and processing circuitry 140. In some embodiments, computing device 118 or control circuitry 128 may be configured as media device 200 of FIG. 2.

Server 102 includes control circuitry 120 and storage 124. Each of storages 124 and 138 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 124, 138 may be used to store various types of content, metadata, and or other types of data (e.g., they can be used to record audio questions asked by one or more participants connected to the conference. Non-volatile memory may also be used (e.g., to launch a boot-up routine and other instructions). Cloud-based storage may be used to supplement storages 124, 138 or instead of storages 124, 138. In some embodiments, the audio portion of the conference may be recorded and stored in one or more of storages 112, 138.

In some embodiments, control circuitry 120 and/or 128 executes instructions for an application stored in memory (e.g., storage 124 and/or storage 138). Specifically, control circuitry 120 and/or 128 may be instructed by the application to perform the functions discussed herein. In some implementations, any action performed by control circuitry 120 and/or 128 may be based on instructions received from the application. For example, the application may be implemented as software or a set of executable instructions that may be stored in storage 124 and/or 138 and executed by control circuitry 120 and/or 128. In some embodiments, the application may be a client/server application where only a client application resides on computing device 118, and a server application resides on server 102.

The application may be implemented using any suitable architecture. For example, it may be a stand-alone application wholly implemented on computing device 118. In such an approach, instructions for the application are stored locally (e.g., in storage 138), and data for use by the application is downloaded on a periodic basis (e.g., from an out-of-band feed, from an Internet resource, or using another suitable approach). Control circuitry 128 may retrieve instructions for the application from storage 138 and process the instructions to perform the functionality described herein. Based on the processed instructions, control circuitry 128 may determine a type of action to perform in response to input received from input circuitry 116 or from communication network 114. For example, in response to determining that a disagreement exists, the control circuitry 128 may perform the steps of process 500 (FIG. 5), process 700 (FIG. 7A), and all the steps and processes described in all the figures depicted herein.

In client/server-based embodiments, control circuitry 128 may include communication circuitry suitable for communicating with an application server (e.g., server 102) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 114). In another example of a client/server-based application, control circuitry 128 runs a web browser that interprets web pages provided by a remote server (e.g., server 102). For example, the remote server may store the instructions for the application in a storage device. The remote server may process the stored instructions using circuitry (e.g., control circuitry 128) and/or generate displays. Computing device 118 may receive the displays generated by the remote server and may display the content of the displays locally via display 134. This way, the processing of the instructions is performed remotely (e.g., by server 102) while the resulting displays, such as the display windows described elsewhere herein, are provided locally on computing device 118. Computing device 118 may receive inputs from the user via input circuitry 116 and transmit those inputs to the remote server for processing and generating the corresponding displays. Alternatively, computing device 118 may receive inputs from the user via input circuitry 116 and process and display the received inputs locally, by control circuitry 128 and display 134, respectively.

Server 102 and computing device 118 may transmit and receive content and data such as media content via communication network 114. For example, server 102 may be a conference provider, and computing device 118 may be a conference or client device configured to allow participants to join a conference, such as the primary conference depicted in FIG. 3. Control circuitry 120, 128 may send and receive commands, requests, and other suitable data through communication network 114 using transceiver circuitry 160, 162, respectively. Control circuitry 120, 128 may communicate directly with each other using transceiver circuits 160, 162, respectively, avoiding communication network 114.

It is understood that computing device 118 is not limited to the embodiments and methods shown and described herein. In nonlimiting examples, computing device 118 may be a conferencing device, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a smartphone, or any other device, computing equipment, or wireless device, and/or combination of the same capable of suitably displaying and manipulating conference content.

Control circuitry 120 and/or 118 may be based on any suitable processing circuitry such as processing circuitry 126 and/or 140, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores).

In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 120 and/or control circuitry 118 are configured to implement a conferencing system, such as systems, or parts thereof, that perform various conferencing processes described and shown in connection with FIGS. 4-11 and/or systems carrying out the features described and shown relative to FIGS. 1A and 1B.

Computing device 118 receives a user input 104 at input circuitry 116. For example, computing device 118 may receive a user input like a user swipe or user touch, as previously discussed. In some embodiments, computing device 118 is a conference device with the capability to allow participants to join a conference and provide meeting tools. It is understood that computing device 118 is not limited to the embodiments and methods shown and described herein. In nonlimiting examples, computing device 118 may be a personal computer (PC), a laptop computer, a tablet computer, a handheld computer, a stationary telephone, a personal digital assistant (PDA), a mobile telephone, a smartphone, or any other conferencing equipment, computing equipment, or wireless device, and/or combination of the same.

User input 104 may be received from a user selection-capturing interface that is separate from device 118, such as a remote-control device, trackpad or any other suitable user movement sensitive or capture devices, or as part of device 118, such as a touchscreen of display 134. Transmission of user input 104 to computing device 118 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 116 may comprise a physical input port such as a 3.5 mm audio jack, RCA audio jack, USB port, ethernet port, or any other suitable connection for receiving audio over a wired connection, or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 140 may receive input 104 from input circuit 116. Processing circuitry 140 may convert or translate the received user input 104 that may be in the form of voice input into a microphone, gestures, or movement to digital signals. In some embodiments, input circuit 116 performs the translation to digital signals. In some embodiments, processing circuitry 140 (or processing circuitry 126, as the case may be) carries out disclosed processes and methods. For example, processing circuitry 140 or processing circuitry 126 may perform processes 500 and 700 of FIGS. 5 and 7, respectively.

FIG. 1B depicts, an exemplary conference call system 170, in accordance with some embodiments of the disclosure. The system 170 includes server 102, as depicted in FIG. 1A, and a communication server 175. The application server 102 and the communication server 175 include computer hardware as depicted in FIG. 1A to enable the storage and processing of conference related information across communications network 144, which includes LAN, WAN, and the Internet. In some embodiments, the server 102 and the communication server 175 may be virtual servers that run on the same computerized device, such as a single processor, a single memory, and a single network interface device.

The communication server 175 may be connected to a human resources (HR) database 177, a scheduling database 179, and a meeting documents database 181. The HR database 177 may comprise a profile of each employee of the company. The profile may include the employee, title, their job description, org chart which depicts all reports, managers and colleagues of the employee, groups to which the employee is connected, and any equipment, processes, job roles, and/or topics controlled by the employee for which the employee has decision making authority.

The scheduling database 179 may comprise a plurality of calendars and availability of systems, equipment, laboratories, and other services provided by the company. The calendar may show real time availability for all services and processes controlled by the company. For example, if an employee needs to schedule the thermal testing lab during the week of June 15th, the control circuitry through the communication server may access the scheduling database and determine availability of the thermal testing lab during the June $15^{th}$ week.

The meeting documents database 181 may include meeting agenda, documents related to the meeting, emails, chats, and other communications relating to the meeting. The control circuitry through the communication server may access the meeting documents database 181 to obtain meeting agenda and schedule primary conference and breakout conferences. The communication circuitry may also access emails, chats, and any other documents exchanged prior to the meeting to determine the participants involved in the conference and, based on the information available, may associate each participant with a particular topic of the agenda.

While in some embodiments each of the HR database 177, scheduling database 179, and meeting documents database, are comprised by the communication server, in other embodiments, that one or all of the databases may be comprised by the server 102 or another server apart from the server 102, which may be an application server, and the communication server 175.

The server 102 may comprise an email interface 185, a scheduling interface 187, an audio interface 189, and a video interface 191. The email interface 185 may be configured to send and receive email communication from participants of the conference session, such as the conference session described in FIG. 3. The server 102 may further comprise a parser 193. The parser 193 may be in communication with the email interface 185 such that it may receive an email communication from a participant of the conference session. The parser may be configured to extract information from the email received and provide it to the control circuitry of FIG. 1A for processing. For example, the parser 193 may extract meeting agenda from the email received and provide it to the control circuitry for creating and managing the primary conference session and any breakout conference sessions. The information extracted by the parser 193 may be stored on local storage 195.

The scheduling interface 187 may be configured to receive calendar invites and other forms of scheduling data. The calendar interface 187 may be operable to receive and/or query a third-party calendar database to retrieve a calendar event. For example, the calendar interface 187 may be configured to interface with a Google™ Calendar application programming interface (API), a Microsoft Teams™ calendar API, and an Outlook™ calendar API. If a calendar invite is received, the scheduling interface 187 may provide to the parser 193 the scheduling details and any information comprised by the calendar such that the information can be passed onto and used by the control circuitry to schedule conference call and breakout conferences and create virtual primary and breakout rooms as needed.

The audio interface 187 may be configured to receive audio instructions to set up a meeting or speech during a conference session. The audio interface may pass the speech and audio sounds to the parser such that they can be analyzed by the control circuitry and meeting related actions can be taken based on the content and context of the speech. For example, the control circuitry may analyze the speech using an artificial intelligence (AI) algorithm and determine that two participants in the conference session have a disagreement for a topic of the agenda and a separate breakout conference to discuss the conflicting views on the topic may be appropriate. The audio information extracted by the parser 193 may be stored on local storage 195.

The video interface 189 may be configured to receive videos and images of participants during a conference session. The images and video data may be parsed by the parser and provided to the control circuitry such that meeting related actions can be taken based on the content and context of the images and video parsed. For example, the control circuitry may analyze the images and video, such as live video, using an artificial intelligence (AI) algorithm and determine that two participants in the conference session have a disagreement for a topic of the agenda and a separate breakout conference to discuss the conflicting views on the topic may be appropriate. The audio information extracted by the parser 193 may be stored on local storage 195.

FIG. 2 is a block diagram of a conference device, in accordance with some embodiments of the disclosure. In an embodiment, the conferencing device 200, is the same conferencing device 102 of FIG. 1A. The conferencing device 200 may receive content and data via input/output (I/O) path 202. The I/O path 202 may provide audio content (e.g., speech input from a participant of the conference call) and data to control circuitry 204, which includes processing circuitry 206 and a storage 208. The control circuitry 204 may be used to send and receive commands, requests, and other suitable data using the I/O path 202. The I/O path 202 may connect the control circuitry 204 (and specifically the processing circuitry 206) to one or more communications paths. I/O functions may be provided by one or more of these communications paths but are shown as a single path in FIG. 2 to avoid overcomplicating the drawing.

The control circuitry 204 may be based on any suitable processing circuitry such as the processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The creating and managing of primary conference and breakout conference sessions and related functions and processes as described herein can be at least partially implemented using the control circuitry 204. The processes as described herein may be implemented in or supported by any suitable software, hardware, or combination thereof. They may also be implemented on servers, such as server 102 in FIG. 1A, on remote servers, or across both.

In client-server-based embodiments, the control circuitry 204 may include communications circuitry suitable for communicating with one or more servers that may at least implement the storing of the all-conference related information, such as meeting agendas, names and profiles of participants, recording of the primary and breakout conference sessions, summarized text relating to the conference sessions, prior meeting transcripts, employee titles, job roles, and org charts, closed caption transcripts of all meetings and related functions and processes as described herein. The instructions for carrying out the above-mentioned functionality may be stored on the one or more servers. Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of conferencing devices, or communication of conferencing devices in locations remote from each other (described in more detail below).

Memory may be an electronic storage device provided as the storage 208 that is part of the control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum storage devices, gaming consoles, gaming media, or any other suitable fixed or removable storage devices, and/or any combination of the same. The storage 208 may be used to store various types of content described herein, such as meeting agendas, names and profiles of participants, recording of the primary and breakout conference sessions, summarized text relating to the conference sessions, prior meeting transcripts, employee titles, job roles, and org charts, closed caption transcripts, and natural language (NLP), machine learning and artificial intelligence (AI) algorithms. Nonvolatile memory may also be used (e.g., to launch a boot-up routine and other instructions). Cloud-based storage, described in relation to FIG. 1, may be used to supplement the storage 208 or instead of the storage 208.

The control circuitry 204 may include audio generating circuitry and tuning circuitry, such as one or more analog tuners, audio generation circuitry, filters or any other suitable tuning or audio circuits or combinations of such circuits. The control circuitry 204 may also include scaler circuitry for upconverting and down converting content into the preferred output format of the conferencing device 200. The control circuitry 204 may also include digital-to-analog converter circuitry and analog-to-digital converter circuitry for converting between digital and analog signals. The tuning and encoding circuitry may be used by the conferencing device 200 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 208 is provided as a separate device from the conferencing device 200, the tuning and encoding circuitry (including multiple tuners) may be associated with the storage 208.

The user may utter instructions to the control circuitry 204, such as during a conference call, which are received by the microphone 216. The microphone 216 may be any microphone (or microphones) capable of detecting human speech. The microphone 216 is connected to the processing circuitry 206 to transmit detected voice commands and other speech thereto for processing. In some embodiments, voice assistants (e.g., Siri, Alexa, Google Home and similar such voice assistants) receive and process the voice commands and other speech.

The conferencing device 200 may include an interface 210. The interface 210 may be any suitable user interface, such as a remote control, mouse, trackball, keypad, keyboard, touch screen, touchpad, stylus input, joystick, or other user input interfaces. A display 212 may be provided as a stand-alone device or integrated with other elements of the conferencing device 200. For example, the display 212 may be a touchscreen or touch-sensitive display. In such circumstances, the interface 210 may be integrated with or combined with the microphone 216. When the interface 210 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 210 may be HDTV-capable. In some embodiments, the display 212 may be a 3D display. The speaker (or speakers) 214 may be provided as integrated with other elements of conferencing device 200 or may be a stand-alone unit. In some embodiments, the display 212 may be outputted through speaker 214.

The conferencing device 200 of FIG. 2 can be implemented in system 100 of FIG. 1A as conferencing device 118, but any other type of conferencing device suitable for creating and managing primary conference and virtual conference breakout sessions and related functions and processes as described herein may be used. For example, conferencing devices such as a laptop, mobile phone, electronic tablet or similar may be used. Conferencing devices may be part of a network of devices. Various network configurations of devices may be implemented and are discussed in more detail below.

Figure 3:
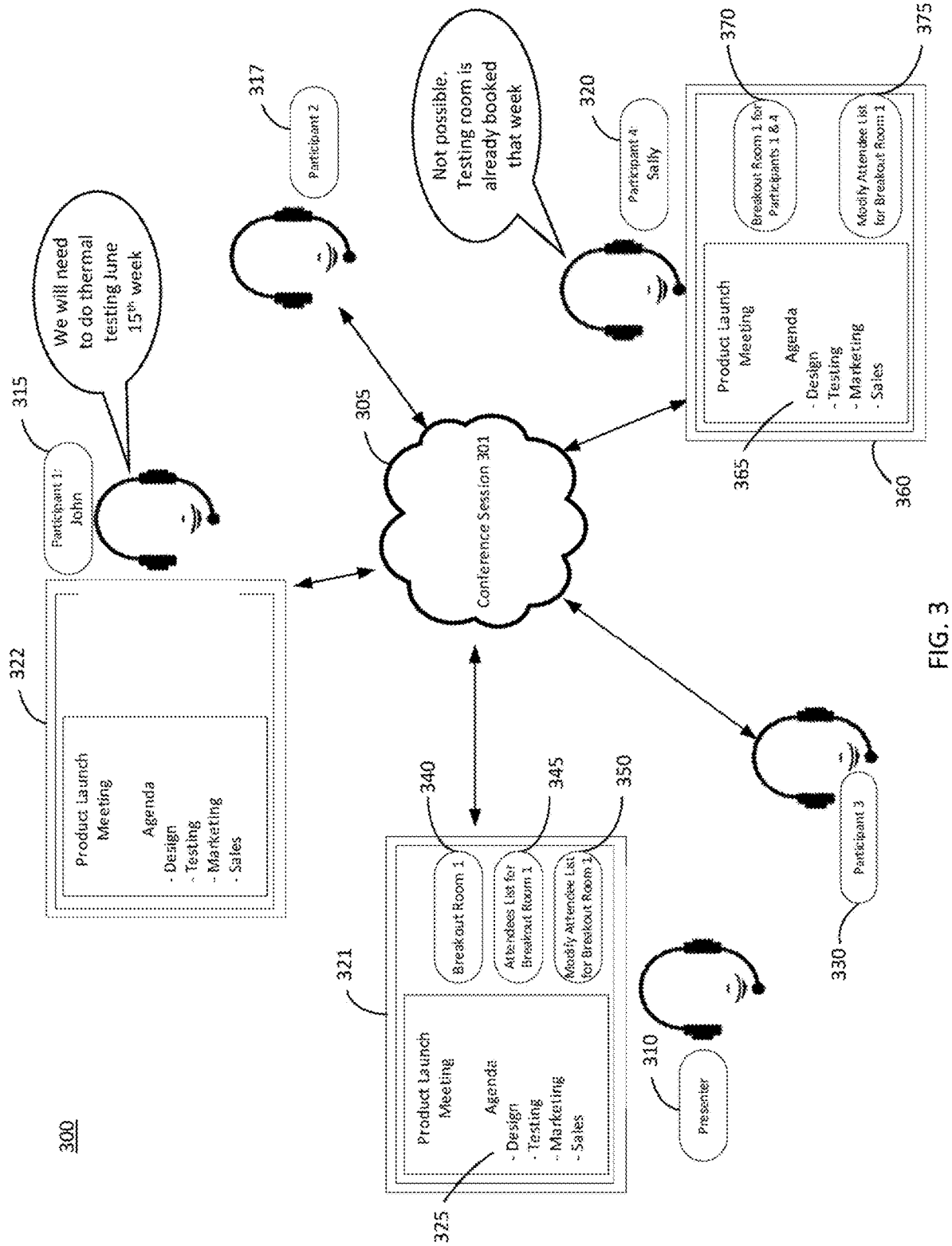
FIG. 3 is block diagram for an exemplary primary conference call, in accordance with some embodiments of the disclosure.

FIG. 3 is block diagram of an exemplary primary conference call, in accordance with some embodiments of the disclosure. The conference call session includes a total of 5 participants 310, 315, 317, 320, and 330. In some embodiments the conference call may have a presenter, a leader, or a moderator. In other embodiments there may be a different number or participants and the conference call may not have a designated presenter or moderator and it may be a meeting where several participants discuss a plurality of topics.

In some embodiments, the conference call session 300 includes a presenter, such as presenter 310. The presenter may lead the meeting and facilitate the discussion of topics in the agenda 325. The presenter may use an electronic device, such as electronic device 321, to manage the conference session 300, to communicate with other participants, and select conferencing options available for the conference session 300.

As depicted in FIG. 3, the electronic device 321 may include a graphic user interface having a display. The system, such as the system depicted in FIGS. 1A, 1B or FIG. 2, through its control circuitry, may cause the display on the graphic user interface which includes the title and agenda 325 of the meeting. The title and the agenda may be obtained from a plurality of sources. For example, a document containing that meeting title and the topics of agenda may have been circulated to the participants of the meeting. The title and agenda may also we obtained through a scheduler, calendar, or a meeting invite dot lists the title and the agenda of the meeting. In some embodiments, the title and agenda may be uttered by one of the participants during the conference call and the system, by applying natural language processing (NLP) algorithms and artificial intelligence (AI) algorithms may determine the topic and agenda based on analyzing the uttered speech.

The control circuitry may also cause to display on the graphic user interface, a conferencing option for creating a breakout conference as needed. The control circuitry, as used herein in refers to control circuitry 128 in FIG. 1A and/or control circuitry 204 in FIG. 2. For ease discussion, control circuitry 204 will be used in the embodiments below, however, both control circuitry 128 in FIG. 1A and/or control circuitry 204 in FIG. 2 may be used interchangeably.

Figure 6:
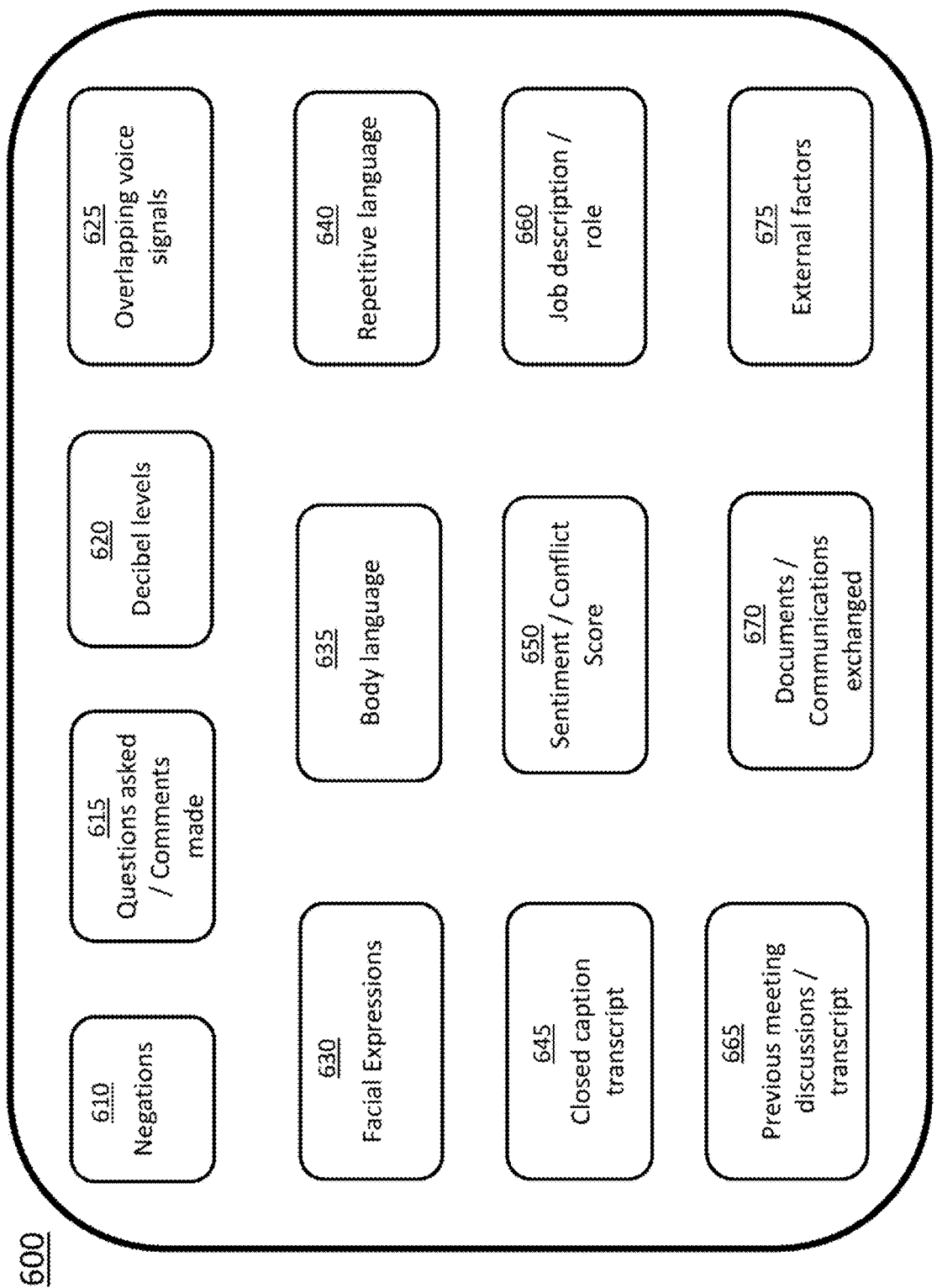
FIG. 6 is block diagram of categories for determining a disagreement, in accordance with some embodiments of the disclosure.
Figure 7A:
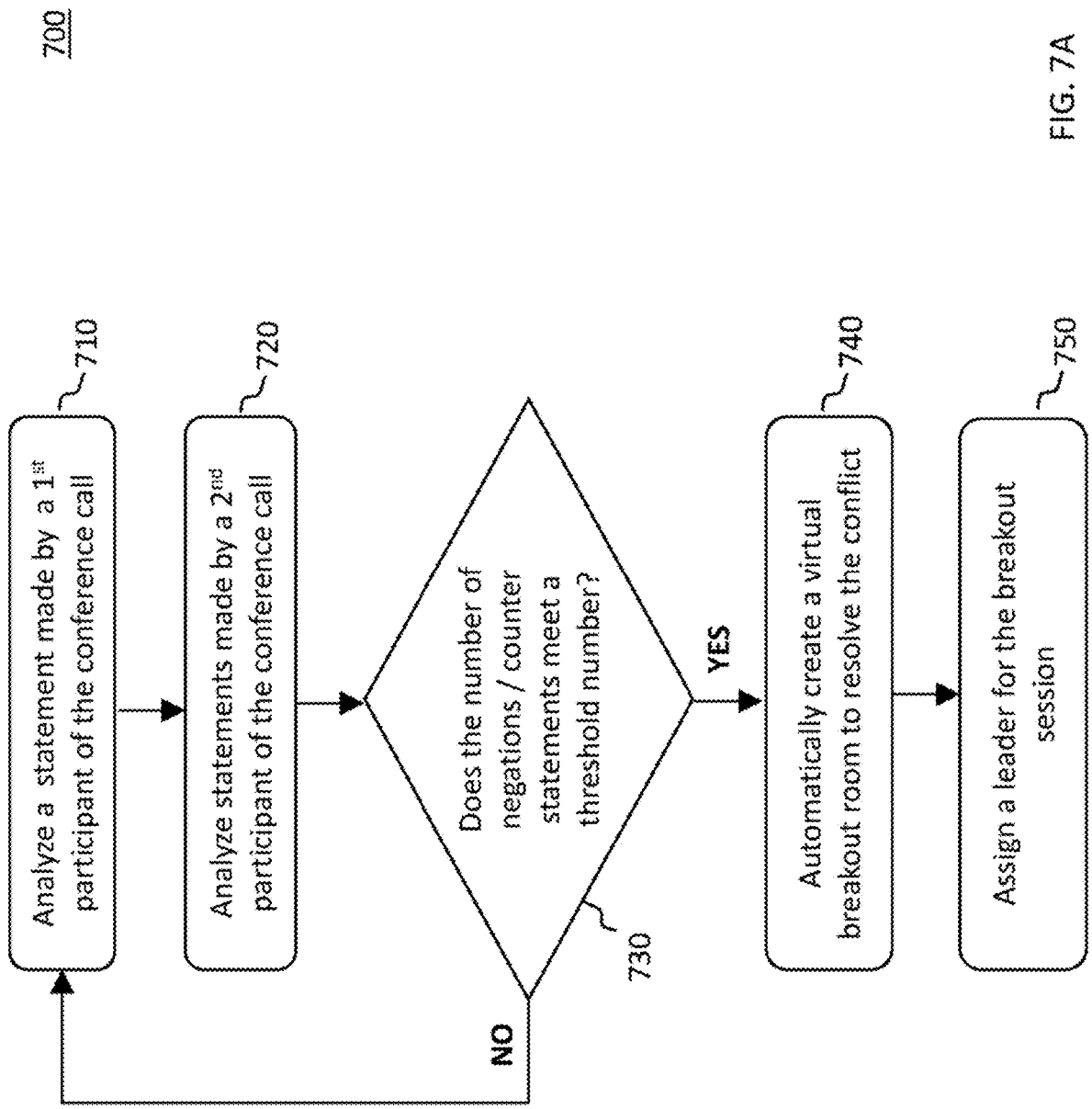
FIG. 7A is flowchart of a process for determining a disagreement between participants in the primary conference, in accordance with some embodiments of the disclosure.

In one example, as depicted in block 340, control circuitry may cause to display on the graphical user interface, an option to the presenter 310, to generate a breakout room 1 (340) for facilitating conversations or disagreements relating to a particular topic. As described further in FIG. 4, the breakout conference may be created automatically when the control circuitry 204 determines, such as through use of AI algorithms, that a particular topic that is part of the agenda 325 requires further attention, requires grouping of certain participants for further discussion, or has conflicting views that may need to be resolved in a separate breakout conference such that the primary conferencing session 300 can proceed without delays. Several categories may be analyzed by the control circuitry 204 to determine whether a particular topic requires further discussion, is the basis for a disagreement, or has conflicting views that require a breakout conference. Some exemplary categories analyzed to determine if a disagreement exists are depicted in FIG. 6.

The control circuitry 204 may also cause to display on the graphic user interface, a list of attendees or conference participants that should discuss the disagreed upon topic in the breakout room 1. The attendee list for the breakout room may be generated through a plurality of techniques and may be based on a variety of factors. For example, an AI algorithm may detect that two people out of a group of five participants have a disagreement on a particular topic.

In some embodiments, all the participants may have a graphic user interface on their electronic device and in other embodiments they may be dialing into the conference using a phone system that does not have a graphic user interface. The embodiments described herein apply to both type of electronic devices.

As depicted, the control circuitry 204 displays the meeting agenda to both participant 1 and 4 on their electronic device's graphic user interface. It may also audibly provide the agenda if the participant's device does not include a display. The exemplary agenda displayed on the electronic devices of the participants may include the topics "Design," "Testing," "Marketing," and "Sales." The exemplary time for the primary conference session 300 to cover the listed topics in the agenda may be 1-hour.

In the example depicted in FIG. 3, participant 1 (John) and participant 4 (Sally) are discussing thermal testing, which is the second topic on the agenda. During the conference session 300, John may ask a question using his audio input equipment (e.g., headset) or speak into a microphone of the electronic device. In this example, John spoke and stated that "We will need to do thermal testing in June 15$^{th}$ week." In response to John's statement relating to thermal testing, Sally may have responded using her audio input equipment (e.g., headset) or spoke into a microphone of her electronic device. In this example, Sally spoke and stated that "Not possible. Testing room is already booked that week." John and Sally's discussion relates to meeting agenda item "Testing" that is listed in the agenda 325.

In some embodiments, the control circuitry 204 may deploy natural language processing (NLP) and artificial intelligence (AI) algorithms to convert their speech to text and then analyze the context of their discussion. The AI algorithm may detect that since John and Sally have different views on testing schedules for the week of June 15$^{th}$ and as such it is better, they discuss scheduling issues in a separate breakout conference. As such the control circuitry may receive the data from AI algorithm and automatically set up a break room 1 such that both John and Sally can discuss the topic of thermal testing separate from the conference session 300. Moving John and Sally's disagreement to a separate breakout conference allows other topics on the meeting agenda be covered by the remaining participants.

In some embodiments, the system, through its control circuitry 204, may be provided access to a plurality of databases and systems of the company. In this example, the participants 310, 315, 317, 320, which include John and Sally, work for the company and are having a work-related meeting. Since the system may have access to employee databases, such as human resources database, the system may also have access to each employee's title, their job function, and their profile.

In this example, the system may determine that Sally is senior to John and holds a higher position in the company. As such, the control circuitry 204 may provide an option on the graphical user interface of Sally's electronic device, who is senior to John, to approve a separate breakout conference such that John and Sally can discuss the thermal testing topic. Since Sally is at a higher position that John, the system may provide the option to approve the creating of the breakout conference only on Sally's electronic device and not on John's electronic device. In other embodiments, both John and Sally may be provided the option to accept breaking out to a separate virtual breakout conference for discussing thermal testing. In yet another embodiment, the system may automatically move John and Sally to breakout room 1 without seeking their approval.

The control circuitry 204 may automatically create the breakout conference at any time during conference session 300. It may also create the breakout conference prior to the start of the meeting if the AI algorithm determines that a disagreement or a deeper discussion on a topic is likely to occur. For example, the AI algorithm may predict a disagreement based on prior meetings or may predict a disagreement based on John and Sally's positions in the company, such as John might be a test engineer who usually needs to test products before launch and Sally might be the director of the testing lab that overseas all testing and testing schedules for various products in the company and that the two roles are usually at conflict with each other.

Although only two participants in this example are presented with a recommendation to move to a breakout conference, the embodiments are not so limited and allow any number of participants in the meeting to move to a breakout conference. In a scenario where all the participants are involved in discussing ta particular topic or involved in a disagreement relating to a particular topic, then a separate breakout room is not created.

Figure 4:
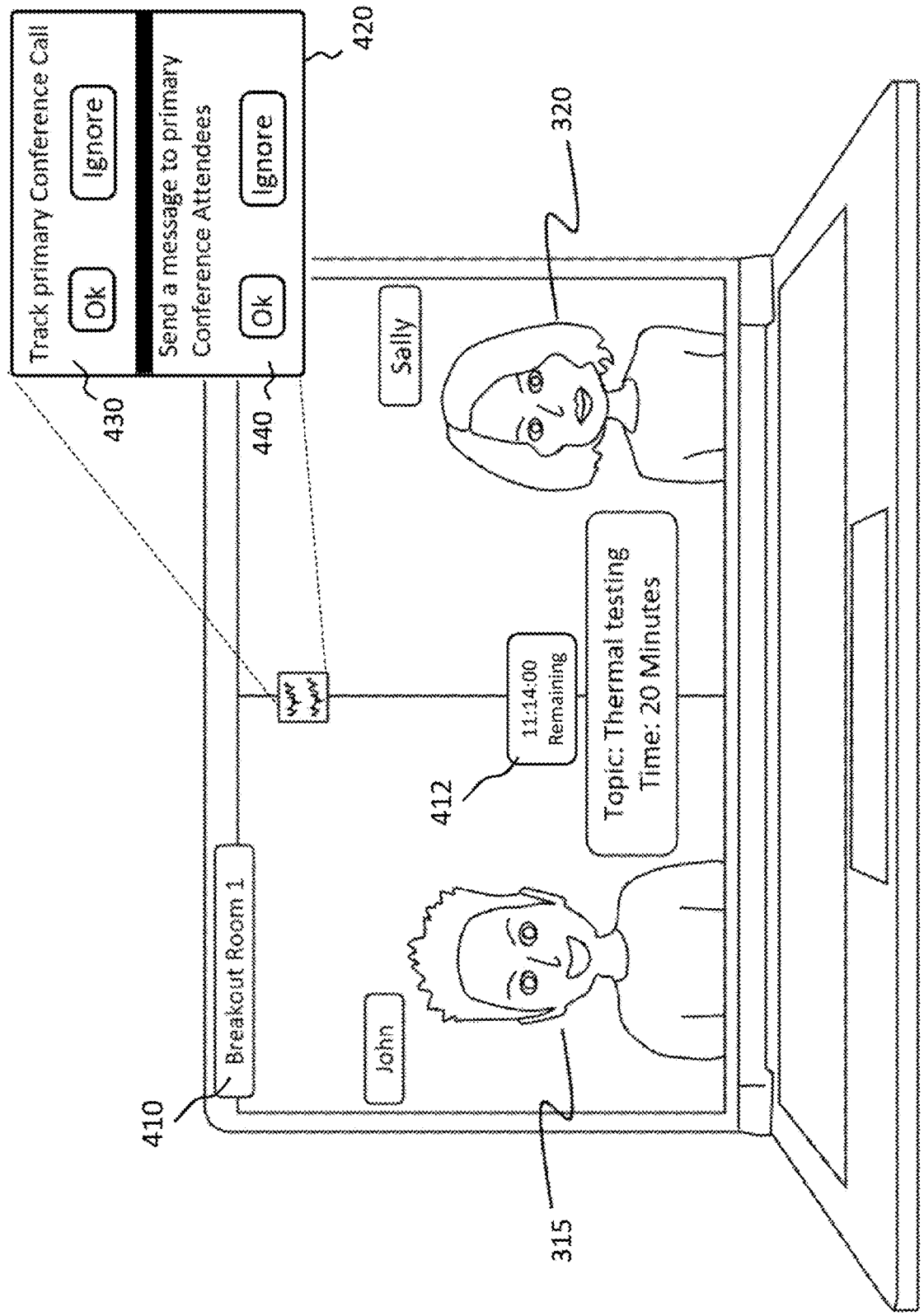
FIG. 4 is block diagram for an exemplary breakout conference, in accordance with some embodiments of the disclosure.

FIG. 4 is a block diagram for an exemplary breakout conference, in accordance with some embodiments of the disclosure. The breakout room 1 (410), where the breakout conference is held, is a virtual room that is automatically created by the control circuitry 204. The breakout room 1 (410) includes John 315 and Sally 320, the two participants from the primary conferencing session 300 that had a disagreement relating to the topic of thermal testing.

In this embodiment, based on the total time allocated for the primary conferencing session 300, the control circuitry 204 determines the time allocated for discussing the topic (thermal testing) and sets a timer in the breakout room 1 such that the participants of the breakout room 1 are aware of the amount of time they have been allotted to discuss the topic and then return to the primary conference 300. In some embodiments, the amount of time allotted in the agenda 325 for discussing this topic is 20 minutes. As such, the control circuitry 204 may cause a timer to be displayed in the virtual breakout room 1 showing the amount of time remaining within the allotted 20 minutes to finish discussion of the topic. As depicted, from the 20 minutes allotted for discussing this topic, 11:14 remains.

The control circuitry 204 may provide additional communication and management tools 30 and 440 to the attendees in the breakout room 1 as depicted in pop up block 420. For example, the attendees in breakout room 1 may be able to monitor and track the progress of the primary conference 300 as depicted in block 430. The control circuitry 204 may provide a selectable option to the attendees 315 and 320 to accept the tracking of the primary conference call or ignore the tracking of the primary conference call. If accepted, the attendees while in a separate breakout room 1 may be able to track the progress of topics in the primary conference session 300. In addition to tracking progress of the main/primary conference call, tracking may include a summary of topics discussed while the breakout conference in breakout room 1 is in progress.

The control circuitry 204 may also allow the attendees of breakout room 1 (410) to communicate and send a message through a communication tool 440 to the primary conference attendees in primary conference session 300. For example, if the AI detects a question in the primary conference session 300 that relates to either John, Sally, or the topic of thermal testing, the control circuitry 204 may present the question as a pop-up display in breakout room 1 and allow the attendees of breakout room 1 to respond to the question. The attendees of breakout room 1 may also send other types of communications and messages to the attendees of the primary conference session 300, such as keeping them informed of the progress being made in breakout room 1 (410), or that they need extra time to finish discussing the topic. The communication tool may allow back and forth messaging between the two separate sessions, i.e., the primary conferencing session 300 and the breakout conference session 410, without the attendees having to leave their respective sessions to communicate or answer a quick question.

The control circuitry 204 may audibly alert the participants of the breakout room 1 (410) when the breakout conference is about to end or has ended. The control circuitry 204 may automatically switch the attendees of the breakout conference back into the primary conferencing session 300 once the timer has expired. As such transitioning from the primary/main conferencing section 300 to the breakout room 1 (410) and then back to the primary conferencing session 300 once the breakout conference has ended is performed seamlessly by the control circuitry 204 without the attendees having to perform steps to create the separate virtual breakout room or having to perform actions to rejoin the primary conferencing section 300. At most, in some embodiments, the control circuitry 204 may present options to the attendees to either approve or reject the creation of the breakout room and the movement from one session to the other. Additionally, the control circuitry 204 may also allow the participants to add or delete additional participants to the breakout conference on an as needed basis.

Figure 5:
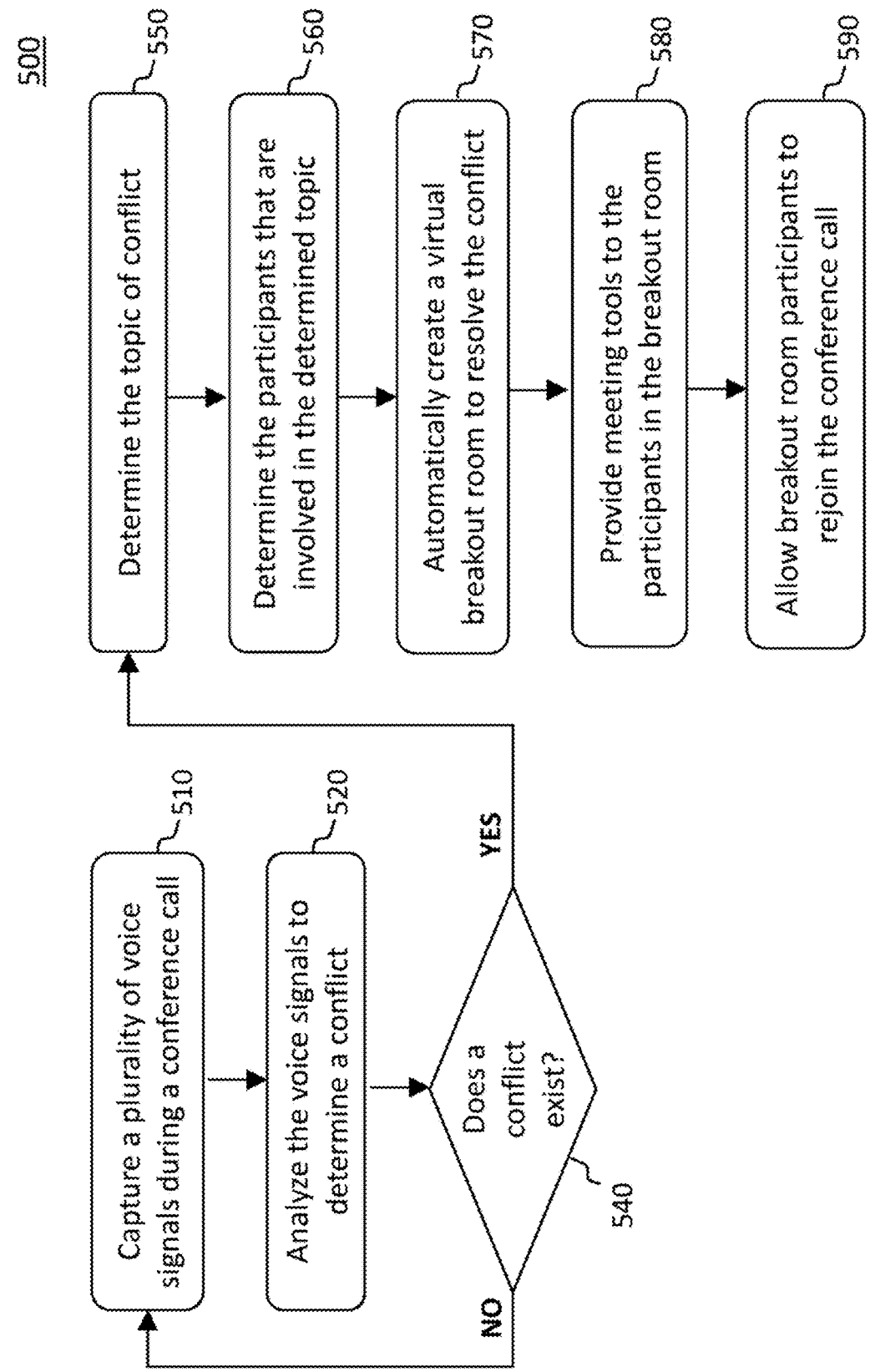
FIG. 5 is flowchart of a process for generating a breakout conference for a primary conference, in accordance with some embodiments of the disclosure.

FIG. 5 is flowchart of a process for generating a breakout conference for a primary conference, in accordance with some embodiments of the disclosure. The process 500 includes, at block 510, capturing a plurality of voice signals during a primary conference call, such as the primary conference call in FIG. 3. In another embodiment, the process may also capture video, images, gestures, chat comments, and other body language and behaviors of the participant, or group of participants, using cameras associated with, or connected to, the conferencing equipment and/or the electronic device used during the conference.

At block 520, the control circuitry 204, using NLP and/or AI algorithms, may analyze the captured voice signals from each participant. In another embodiment a closed caption file may be created based on the voice input, i.e., uttered words, phrases, and statements, from each participant. The AI algorithm may analyze the voice signals or the closed caption file to determine whether a disagreement exists. For example, the AI algorithm may determine if any negative comments were uttered between participants during the conference that indicate a disagreement. The AI algorithm may also look at other categories, such as categories described in connection with FIG. 6, to determine if a disagreement exists with respect to a particular topic or if the topic needs additional discussion, and if so, whether a separate breakout conference may be created.

If at block 540 a determination is made that a disagreement exists, or that a particular topic needs additional discussion, then the process proceeds to block 550 where the AI algorithm determines the topic of the disagreement. For example, as depicted in FIG. 3, John and Sally disagree on a schedule for thermal testing, as such, the AI algorithm would determine that the topic of thermal testing needs resolution and both John and Sally currently have conflicting views for the testing schedule.

At block 560, the AI algorithm determines the participants that are involved in the disagreement. In some embodiments there may be two participants that disagree with each other on a particular topic. In other embodiments, there may be a few participants that agree on a direction for the topic and a few participants that have a different direction for the topic. The system may also group participants that agree into a separate breakout session such that they may discuss the topic in further details such that they can present more convincing point to those participants that disagree with their position.

In addition to determining the participants for the breakout conference, the control circuitry 204 may also assign a leader for the breakout conference. In some embodiments, the system may be provided access to a plurality of databases and systems that are associated with the participants in the primary conference session 300. For example, in a corporate setting, the system may be provided access to human resources databases, databases that store information relating to meetings, and information relating to employee titles, job descriptions, and org charts. The control circuitry 204 may access relevant databases to determine each participant's title, role, and job description, and use such information to determine the leader for each breakout conference. Accordingly, the control circuitry 204 may pick the person with the most seniority, or the highest title, or authority over a topic, to lead the breakout conference. In another embodiment the system may determine that a participant who is not the most senior person but the most knowledgeable person on a particular topic to be the leader.

The control circuitry 204 at block 570 may automatically create one or more virtual breakout rooms where a virtual breakout conference can be hld. It may also determine participants connected with the disagreement that need to move to the virtual breakout conference to resolve their disagreement. In a scenario where 3 participants agree on a first direction for the topic and a $4^{th}$ participant disagrees with the first direction and proposes a second direction for the topic, the control circuitry 204 may decide to create a virtual breakout conference room for the 3 participants that agree on the first direction such that they may further discuss the first direction and present a full solution to convince the 4th person. In another embodiment may create a virtual breakout room such that all four participants may discuss the topic and resolve their concerns.

Once a breakout conference is created, which may be in real time, the system through its control circuitry 204 may provide a selectable option on the graphic user interface of the participants that are going to discuss the topic in the breakout conference. The selectable option may allow the participants to either approve the breakout conference or reject the option to create a separate breakout conference for discussion of the topic. In some embodiments, the system may provide the selectable option only to the most senior person that will be leading the breakout conference. In another embodiment the selectable option may be provided to all the participants that will be involved in the breakout conference. In yet another embodiment, the system may automatically move the participants to the breakout conference without seeking their approval.

At block 580, the system may provide meeting tools to the participants in the virtual breakout conference. In some embodiment, one of the tools provided in the breakout conference may be a breakout conference timer. Since the control circuitry 204 may have access to the agenda 325, the control circuitry 204 may determine the amount of time allocated for each topic in the agenda. For example, if a particular topic has 20 minutes allocated to it, then the control circuitry 204 may start at 20-minute timer and display it on all participants electronic devices such that they can keep track of time while discussing the topic in the breakout conference. In another embodiment, if a time has not been allocated for the topic of the breakout conference, then the control circuitry 204, using an AI algorithm, may determine a time for the breakout conference based on the discussion of the topic in previous meetings or in the primary conference. In yet another embodiment, the control circuit may allocate a time for the breakout conference and allow the participants to modify the allocated time as needed.

In some embodiments, another meeting tool provided in the breakout conference may be the option to track the progress of the primary/main conference 300 while the participants are in the breakout conference. The tracking may allow the participants to keep track of the progress being made in the primary conference section 300. For example, if in the primary conference session, the discussion has moved to the next topic, then the participants in the breakout room may use that information to perform necessary actions, such as end the breakout conference early so they can get back to the primary conference or ask for additional time to discuss the topic in the breakout conference.

Yet another meeting tool provided by the control circuitry 204 may be the ability to communicate with the participants in the main/primary conference session 300. The participants may use the communication tool to provide an update of the breakout conference, answer any questions that may come up in the primary conference section 300, or provide any other communications to participants of the primary conference session 300. As such, the communication tool may allow back and forth communication between the primary conference session 300 and a breakout conference without the participants having to leave their respective sessions.

At block 590, the system may automatically move the participants from the breakout room to the primary conference session 300. The system may perform the move when the timer ends or when a participant in the breakout conference ends the breakout conference. In another embodiment, the system may provide a selectable option to the participants of the breakout conference to approve the move to the primary conference session 300, and, upon receiving an approval through the selectable option, move the participants to the primary conference without the participants having to perform any additional actions for executing the move.

FIG. 6 is block diagram of categories for determining a disagreement, in accordance with some embodiments of the disclosure. The control circuitry 204 may analyze one or more categories depicted in FIG. 6, such as by using an AI algorithm, to determine if a disagreement between participants exists. If a determination is made by the control circuitry 204 that a disagreement exists, then the control circuitry 204, by using the AI algorithm, may determine the topic of the disagreement and the participants involved in the disagreement such that it may automatically create a virtual breakout conference and move the participants involved in the disagreement to the breakout conference.

As depicted in block 610, negations are one of the exemplary categories that may be analyzed by the control circuitry 204, such as by using an AI algorithm, to determine if a disagreement exists with respect to a particular topic or if the topic needs additional discussion, and if so, whether a separate breakout conference may be created. As used herein, negations include disagreements, different opinions, comments that counter and provide an opposing or a different view of the prior statements, or words that express frustrations.

In this example, an NLP algorithm may convert the speech/voice input of each participant into a textual format such that may be analyzed using an AI algorithm. The AI algorithm may use process 700 of FIG. 7A to determine if there is a disagreement between two participants of the conference session.

In some embodiments, the process 700 may begin at block 710, where the AI algorithm monitors voice input by all participants in the primary conference session. At block 710, a first statement made by a first participant is analyzed. The analysis includes determining the context and the topic of the statement. The analysis also determines whether the statement requires a response from another participant.

At block 720, the AI algorithm is used by the control circuitry 204 to analyze statements made by a second participant of the conference call. The analysis includes determining the context and the topic of the statement. The AI algorithm may analyze words, phrases, and context of both statements from the first and second participants to determine if the statements relate to each other and if the second statement negates the first statement. The AI algorithm may be used to determine if a word, phrase, or comment is a negation or a different point of view. The control circuitry may access dictionaries and other resources that can aid the AI algorithm in determining if the response negates the earlier statement. Negations may include words and phrases such as, "no," "not," "does not work," "cannot," and other variations that disagree with the statements made by the first participant. In other embodiments, the AI algorithm may be used to determine the context of the comment made by the second participant to determine if it negates or provides a different opinion on the topic of the statement made by the first participant. For example, the second participant may utter phrases such as "that could work, but a better way of doing that is," or "maybe we should try," "we tried that last time," which may need to be analyzed based on the context of the discussion to determine whether the statements negate the prior statement thereby creating a disagreement.

At block 730, the AI algorithm is used by the control circuitry 204 to determine if the number of negations or counter statements meet a threshold number. The threshold may be a predetermined number that is determined by the system or the user and may be used to ensure that the negations in fact create a disagreement and is not simply another view or comment that does not rise to the degree of a disagreement that needs a separate breakout conference to be resolved. Since not all negations in a conversation rise to the level of a disagreement, the control circuitry may explore the negations in light of the context and also analyze the degree of the negation, such as a strong disagreement or a minor negation or comment that does not create a disagreement, to explore breakout conference creating options.

One example of applying natural language processing and artificial intelligence (AI) at blocks 720 and 730 is provided in FIG. 7B. In this example each voice input from a participant is provided to an NLP engine that has instructions stored therein, or in a separate database, to run a natural language processing (NLP) algorithm. As depicted in FIG. 7B, the NLP algorithm uses various speech processing techniques to convert the voice input into text and, determine relevance of each word, and select keywords that are indicative of the context of the voice input. In some embodiments the NLP algorithm (or the artificial intelligence algorithm) can determine the most relevant portions of the voice input, such as relevant text, text strings, tags, timing of the words, and relationship to the topic in the meeting agenda. For example, in a statement "what is the temperature used for the test," the NLP algorithm may select key words "temperature" and "test" that is representative of the context of the voice input and feed them to the artificial intelligence engine that runs an AI algorithm.

The AI algorithm may then contextually make sense of the statement, such as by using off the shelf speech analysis software, and relate each keyword or voice input to a topic of the meeting agenda. In another example in FIG. 7B, the AI engine, executing instructions to apply an AI algorithm, may contextually relate one voice input with another voice input. For example, it may relate the voice input "its 400 degrees F." to be contextually related and associate as a response to an earlier voice input "what is the temperature used for the test." Likewise, the AI algorithm may detect that voice input "That will not work" is a negation and is contextually related to a prior voice input "We need to do the test next week." The AI algorithm may also use external resources, such as a library database that can be used by the AI algorithm to make word associations and determine whether a word or phrase is associated with a disagreement or negation. The AI algorithm may also use off the shelf speech processing and other tools to determine if a word/phrase can be considered as a negation or disagreement.

Referring back to FIG. 7A, if a determination is made at block 730, that the number of negations or counter statements meet the threshold number, then at block 740 the control circuitry 204 automatically creates a virtual breakout conference to resolve the disagreement. In another embodiment, when the number of negations or counter statements does not meet the threshold number, however the control circuitry 204, through the use of AI algorithm, determines that the negation is strong enough, has a diametrically opposite view, or is stated in a manner that creates a disagreement, then the control circuitry may conclude that a disagreement exists and create the separate breakout conference.

Additionally, at block 730, if the number of negations or counter statements do not meet a threshold number, and the negation is not strong enough to rise to the level of a conflict, then the control circuitry 204 continues to monitor the conversations in the primary conference 300 and evaluate each statement in response to the statement and follow the process from block 710 onwards.

At block 750, once a decision has been made to create a breakout conference, then the control circuitry 204, which has access to a plurality of systems or databases, determines the leader for the breakout conference based on the employee profiles or other information that indicates which of the participants for the breakout session is senior to others or has the responsibility of the topic.

Referring back to FIG. 6, as depicted in block 615, "Questions asked/Comments made" is one of the exemplary categories that may be analyzed by the control circuitry 204, such as by using an AI algorithm, to determine if a disagreement exists with respect to a particular topic or if the topic needs additional discussion, and if so, whether a separate breakout conference may be created. There may be questions asked during the primary conference or comments made such as "we should take that offline," or "that is going to need some more time," "let's table that discussion for next time," "we need to get Bob on the call to answer that question," that are not necessarily negations or disagreements but may require either additional time for discussion of the topic or require additional participants that may not be part of the primary conference. The control circuitry 204, using AI algorithm, may determine that such discussions that need additional time or additional participants can be broken out from the current primary conference session such that they may be discussed separately. In such situations, the control circuitry 204 may present a selectable option to the attendees, where the selectable options may allow the control circuitry 204 to create a breakout conference either during the primary conference call or schedule it at a later time. If the breakout session is to be created during the conference time and requires additional participants, the control circuitry 204 may present a selectable option to the current participants such that if selected, the control circuitry 204 may in real time contact the other participants that are not part of the current meeting and ask them to join the breakout conference. Accordingly, the control circuitry 204 may automatically set up a breakout conference and move those participants that are involved in discussing the topic, and seamlessly integrate additional participants that are needed for the breakout conference but were not part of the primary conference session into the breakout conference. The control circuitry may also provide limited access to the additional participants added such that they are provided access only to the breakout conference.

As depicted in block 620, decibel levels of the participants may be monitored and analyzed by the control circuitry 204, such as by using an AI algorithm, to determine if a disagreement exists with respect to a particular topic or if the topic needs additional discussion, and if so, whether a separate breakout conference may be created. In some embodiments, the control circuitry 204 monitors the decibel levels during the primary conference session and calculates an average decibel level. In a typical conversation, when there's a conflict, disagreement, or a heated argument the volume of the participant's speech may increase to a higher decibel level. As such, if the decibel level exceeds the average decibel level by a threshold amount during the conference call, then a determination is made whether the higher decibel level is associated with a disagreement or a heated discussion. If the control circuitry 204 determines that the higher decibel level is associated with a disagreement, then a separate virtual breakout room is automatically created and either a recommendation is provided to the attendees involved in the disagreement to move to the breakout conference or the system may automatically move them to the breakout room without seeking their approval.

For example, FIGS. 8A and 8B depict a situation when a higher decibel level may be captured and associated with a disagreement. As shown in FIG. 8A, a plurality of participants P1-P6 may be attending a primary conference session. The control circuitry 204 may monitor each participant's speech and associated decibel level and calculate an average decibel level for the conferencing session. As shown, a voice signal 810 is captured for participant P1, a voice signal 820 is captured for participant P2, a voice signal 830 is captured for a participant P4, and a voice signal 840 is captured for participant P6. As depicted, participants P3 and P5 may not have spoken during the conference and as such no voice signal has been captured.

FIG. 8B is a table that depicts a time at which each voice signal was captured, in accordance with some embodiments of the disclosure. As depicted, participant P1 may have spoken at time t=1 and in response to their speech, the control circuitry 204 may have captured the voice signal 820 and determined a decibel level associated with the voice signal. If decibel level associated with participant P1's voice signal 810 is taken as an average decibel level for the conversation, then, in some exemplary embodiments, as depicted by voice signal 820, participant P2 has a higher decibel level associated with their voice signal as compared to the average decibel level. If P2's decibel level exceeds the average decibel level by a threshold number, then the control circuitry 204 may determine that P2's decibel level is associated with a disagreement and the control circuitry 204 may automatically create a separate virtual breakout conference. The control circuitry may also include participant P2 and anyone else from the primary conference session that is also involved with the same topic for which P2's decibel level was raised to the breakout conference.

As depicted in block 625, overlapping voice signals of the participants speaking over each other are analyzed by the control circuitry 204, such as by using an AI algorithm, to determine if a disagreement exists with respect to a particular topic or if the topic needs additional discussion, and if so, whether a separate breakout conference may be created. When a conflict, disagreement, or a heated argument takes place in a conversation, it is typical for participants to speak over each other to get their point across. As such, if the control circuitry 204 determines that multiple voice signals overlap each other, then a determination is made whether the overlapping voice signals are associated with a disagreement or a heated discussion. For example, as shown in FIG. 8B, which is a table of voice signals captured for each of the participants P1-P6 in FIG. 8A, at time t=2, participants P2 and P4 have overlapping voice signals 860. If the control circuitry 204 determines that the overlapping voice signal 860 is associated with a disagreement, then a separate virtual breakout room is automatically created and either a recommendation is presented to the attendees involved in the disagreement to approve a move to the breakout conference or the system may automatically move them to the breakout conference without seeking their approval.

As depicted in block 630, facial expressions of the participants may be analyzed by the control circuitry 204, such as by using an AI algorithm, to determine if facial expressions made during the discussion of a particular topic are indicative of a conflict, frustration, disagreements and may require a separate breakout conference for resolution. In some embodiments, the control circuitry 204 may access a camera associated with either the conferencing equipment or the electronic device used by a participant during the conferencing session. For example, the participant may be using a laptop that includes a camera, or the participant may be in a conference room which has a separate camera that is associated with the conferencing equipment, or the participant may be using a mobile phone or a tablet that includes a camera. As depicted in FIG. 8A, the control circuitry 204, accessing a camera, make capture an image of participant P3. Using the AI algorithm, that control circuitry 204 may analyze the image and determine that P3 is frustrated with the current discussion in the primary conference. The control circuitry 204 made determine the topic of discussion at the time the image of P3 is captured and determine that a separate breakout conference is needed due to P3's frustration with the topic. If the control circuitry 204 determines that the facial expressions of P3 are associated with a disagreement, then a separate virtual breakout room may be automatically created and P3 and at least one more participant who is involved in the discussion of the same topic may be invited to move to the separate virtual breakout room to further discuss the topic or the system may automatically move them to the breakout conference without seeking their approval.

In addition to facial expressions, the camera may also capture a participant's body language, as depicted in block 635. If the control circuitry 204 determines that a participant's body language is indicative of their disagreement of the current conversation, then the control circuitry 204 may determine the topic of the current conversation, and automatically create a separate breakout conference such that participants involved in the topic and those whose body language implies a disagreement are either invited or automatically moved to the breakout conference without seeking their approval.

As depicted in block 640, repetitive language uttered by a participant may be analyzed by the control circuitry 204, such as by using an AI algorithm, to determine if the repetitive language may be associated with a disagreement or conflict and uttered repeatedly to get their point across and convince the other participant involved in the discussion.

In a typical conversation, when someone's point is not being understood or accepted, the participant may utter the same or similar words repeatedly to convince the participants that disagree with them. In some embodiments, the participant may utter the same words and phrases repeatedly and in other embodiments the participant may utter other words and phrases that contextually convey the same point in an attempt to convey their position to others that disagree with their position. If the control circuitry 204 determines that a participant's repeated words or repeated language contextually conveys the same point, then the control circuitry 204 may determine whether the repetition is associated with a disagreement. Since not every repetition is associated with the disagreement, the AI will determine if the repetition is associated contextually with a disagreement. If a determination is made by the control circuitry 204 that a disagreement exists, then the control circuitry 204 may automatically create a separate virtual breakout conference and either a recommendation is presented to the attendees involved in the disagreement to approve a move to the breakout conference or the system may automatically move them to the breakout conference without seeking their approval.

As depicted in block 645, a closed caption of the speech uttered by the plurality of participants may be generated by the control circuitry 204. A natural language processing (NLP) algorithm may be utilized by the control circuitry 204 to convert that uttered speech into textual metadata. The control circuitry 204 may generate a close caption file in storage in a database associated with the control circuitry 204. The closed caption file may be analyzed using the AI algorithm to determine if a disagreement between two or more participants exists. If a determination is made by the control circuitry 204 based on the analysis of the closed caption file that a disagreement exists, then the control circuitry 204 may automatically create a virtual breakout conference for discussion of the topic related to the disagreement and either present a recommendation to the attendees involved in the disagreement to approve a move to the breakout conference or the system may automatically move them to the breakout conference without seeking their approval.

As depicted in block 650, an overall sentiment may be analyzed by calculating a conflict/disagreement score for the primary conference. The sentiment may be analyzed by the control circuitry 204, such as by using an AI algorithm, to determine if the sentiment value with respect to a topic is positive or negative. If the sentiment is negative, a threshold may be established and if the threshold value is met then a separate breakout conference may be generated by the control circuitry 204 for discussing the topic relating to the sentiment.

Figure 9:
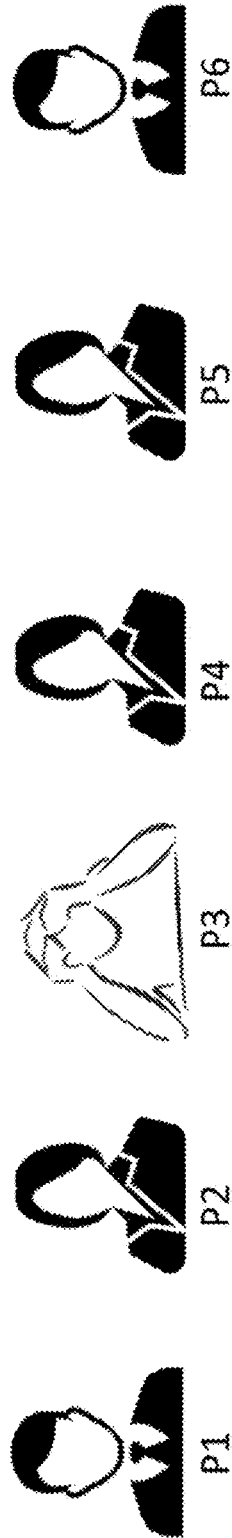
FIG. 9 is a table of conflict score that represents a sentiment of the participants in the primary conference, in accordance with some embodiments of the disclosure.

As depicted in FIG. 9, in some embodiments, the control circuitry 204, using the AI algorithm, may perform a sentiment analysis. In some embodiments, as part of the sentiment analysis, the control circuitry 204 may analyze each statement made by a participant of the conference session with respect to a particular topic. The AI algorithm may analyze the statement to determine whether it is a positive or a negative statement, i.e., whether a participant agrees or disagrees with the position taken with respect to a topic. The control circuitry 204 may monitor a sentiment value for each topic separately. A positive statement which agrees with the prior statement may be scored positively as a +1 and a negative statement scored as a −1. A counter may keep track of the positive and negative statements and update the overall score.

As depicted in FIG. 9, the exemplary topic of the conversation in the conference session relates to pricing the product at $50 USD. The statement made by participant P1 is analyzed by the AI algorithm and scored. In this example, since participant P1's statements agree with the pricing, a conflict score of +1 is recorded. Likewise participant P2 statements are also analyzed by the AI algorithm. As depicted, participant P2 disagrees with the concept of pricing the product at $50 USD, as such, a conflict score of −1 is given based on P2 statements. The control circuitry 204 keeps her running score of the sentiment as. Since P2's disagreement cancels out P1's agreement, the total sentiment score after P2's disagreement is 0. In addition to statements, control circuitry 204 may also analyze facial expressions and body language when performing a sentiment analysis. Since P3's body language suggests that P3 is frustrated with the pricing, the AI algorithm may analyze P3's body language in context with the conversation and determine whether P3's body language should be associated with an agreement or a disagreement with respect to the $50 USD target price for the product. As depicted, P3's body language is associated with a disagreement and ask such given a −1 conflict score. The control circuitry 204 may also set a predetermined threshold for a negative sentiment value. When the total sentiment value reaches the negative threshold, then a separate breakout conference may be generated by the control circuitry 204 for discussing the topic relating to the sentiment.

Referring back to FIG. 6, as depicted in block 660, the participant's job description and role in the company may be analyzed by the control circuitry 204, such as by using an AI algorithm, to determine if the different job descriptions and roles of participants in the conference session may create a potential disagreement. For example, if one of the participants of the conference session is in marketing and their job title and duties relate to ensuring that the product gets released to the public quickly and another participant of the conference session is in product testing and their job title and role lends to making sure the product is not released until it is thoroughly tested, then the AI algorithm may determine that the two participants may be at odds with respect to a topic of product release, the speed at which the product is released, and product release schedule. Accordingly, in some embodiments, the control circuitry may analyze the job title and job role of the participants using the AI algorithm prior to the start of the meeting. Based on a likelihood of a conflicting topic, the control circuitry may automatically create a virtual breakout conference prior to the start of the primary conference and provide an option to certain participants when a conflicting topic is raised in the primary conference session.

As depicted in block 665, transcripts from previous meetings may be analyzed by the control circuitry 204, such as by using an AI algorithm, to determine if any topics discussed in the previous meetings resulted in a disagreement. As such, if the same topic that created a disagreement in the previous meeting is brought up in the current conference session, then the control circuitry 204 may automatically create a separate virtual breakout conference such that the topic that raised the disagreement previously can be discussed in the separate breakout conference.

As depicted in block 670, documents and communications exchange prior to the conferencing session, such as agenda, emails, chats, Slack™ messages, and any other messages may be analyzed by the control circuitry 204, such as by using an AI algorithm, to determine if the documents and communications indicate conflicting views from the participants that will be attending the conference session, and if so, then a separate virtual breakout room is automatically created and either a recommendation is presented to the attendees involved in the disagreement or the potential disagreement to approve a move to the breakout conference or the system may automatically move them to the breakout conference without seeking their approval. (Slack is a trademark owned by Slack Technologies, Inc.).

In some embodiments, the control circuitry 204 may be given access to calendars, emails, schedules, databases, and other platforms of communications used in a company. The control circuitry 204 may access documents and messages exchanged using the platforms and use the AI algorithm to analyze the context of such documents and communications. Based on the analysis, the control circuitry 204 may determine that certain participants that exchanged conflicting views in their communications regarding a topic prior to the meeting are likely to have the same disagreement during the conferencing session. As such, the control circuitry may automatically create a separate virtual breakout room for the participants that had conflicting positions such that the topic that raised the disagreement in the documents and communications can be discussed in the separate breakout room. The control circuitry may then either provide a recommendation to the attendees involved in the disagreement or potential disagreement to approve a move to the breakout conference or the system may automatically move them to the breakout conference without seeking their approval.

In addition to the categories describe in FIG. 6, there may be other external factors 675 that may indicate the presence of a disagreement between participants of the primary conference. For example, if a particular topic needs additional information for making a decision, the control circuitry may create a separate breakout conference/session such that the information needed can be obtained and discussed.

Figure 10:
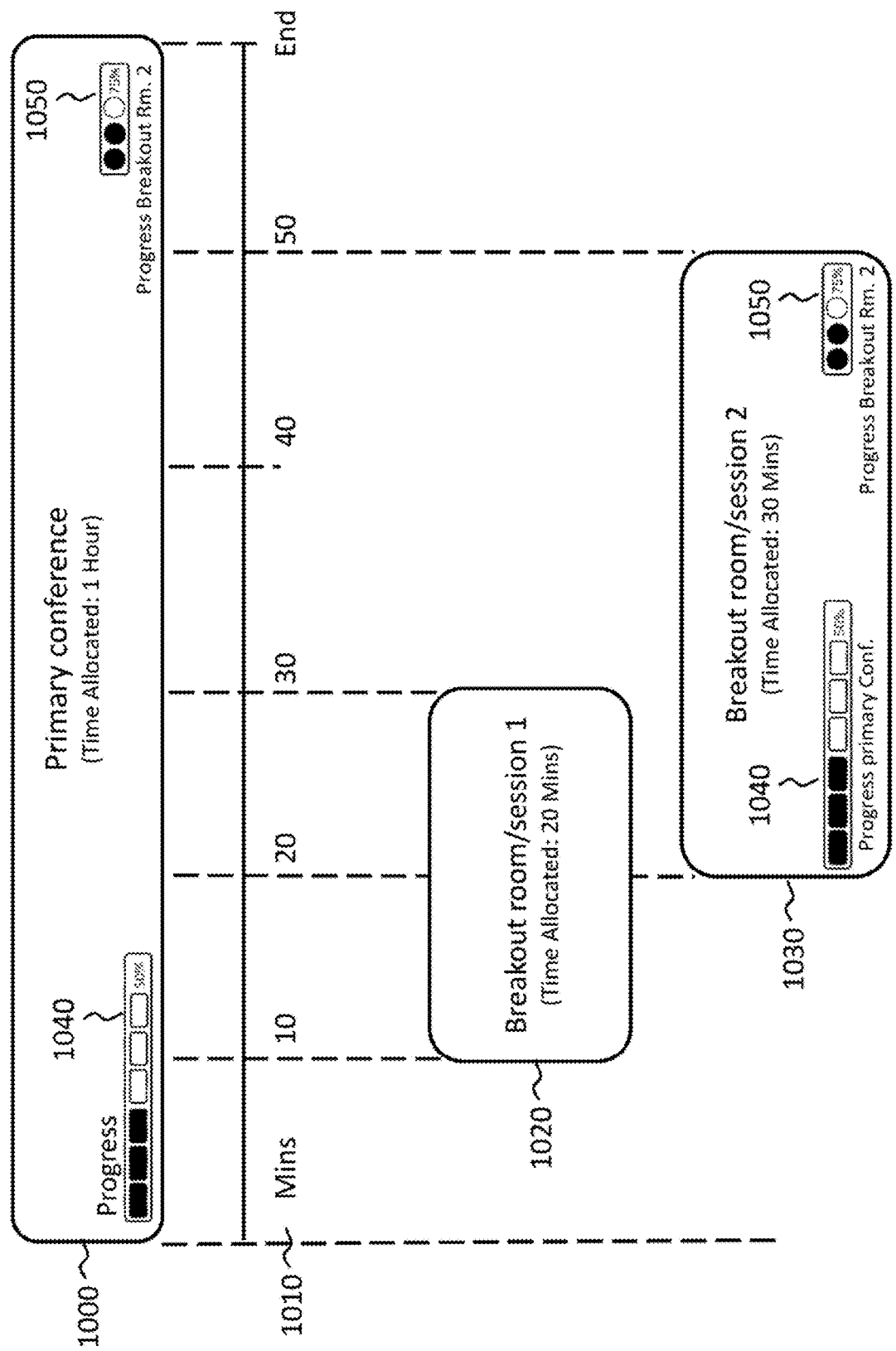
FIG. 10 is block diagram for a primary and multiple breakout conference sessions, in accordance with some embodiments of the disclosure.

FIG. 10 is block diagram for a primary and multiple breakout conference sessions, in accordance with some embodiments of the disclosure. In some embodiments, the control circuitry may create multiple virtual breakout rooms 1020 and 1030 that are breakout conferences to discuss separate topics related to the primary conference 1000.

In some embodiments, the breakout room 1 may be created by the control circuitry 204. The primary conference may have an agenda that includes a plurality of topics. If a disagreement is detected by the control circuitry 204, then the control circuitry, through use of NLP and AI algorithms, may determine the topic of disagreement, determine attendees involved in the disagreement, and automatically create breakout room 1 (1020). In other embodiments, if there is any other indication besides a disagreement that a particular topic needs additional discussion, then the control circuitry may automatically create breakout room 1 (1020).

The control circuitry may also determine time allocated for each topic in the agenda of the primary conference 1000. When a time is not allocated for each topic, the control circuitry 204, through use of AI and machine learning algorithms, may allocate a time for the breakout conference based on time allocations for same/similar topics in previous meetings or between different topics discussed by the same participants at previous meetings. The time allocated for the breakout conference, for example, may be 10, 20, or 30 minutes. In this example, the time allocated for the primary conference session is 1 hour and the time allocated for breakout room 1 (1020) is 20 minutes.

Each breakout room may include a plurality of meeting management and communication tools. These meeting management and communication tools 1100 are discussed further in FIG. 11. In some embodiments, the meeting management tool for the breakout room 1 (1020) includes a timer that informs the attendees of the breakout conference of the total time allocated for the breakout conference and the time remaining to complete discussion of the topic in the breakout conference. The control circuitry 204 may also provide alerts at certain intervals within the time allotted for the break session, such as every 5 or 10 minutes, 2 minutes before the meeting time will expire, and when the meeting has ended. Other time intervals for alerts are also contemplated and can be adjusted by the control circuitry 204 or by the participants of the breakout conference. An extension of time option may also be provided to the participants in the event the breakout conference requires additional time for discussing the topic.

At the end of the 20 minutes allocated time for breakout room 1(1020), the participants of the breakout conference may automatically and seamlessly be integrated back into the primary conference. For example, if the breakout conference in breakout room 1 (1020) ends on time, then the participants will be integrated back into the primary conference 1000 at time marker 30 minutes without having to input any commands that relate to moving back to the primary conference.

In some embodiments, the breakout room 2 (1030) may be created by the control circuitry. The topic for the breakout room 2 (1030) may be obtained from the primary conference session 1000 and the control circuitry may allocate a time, such as 30 minutes, based on the time allocated for the topic in the agenda. As explained earlier, if the topic has not been allocated a certain amount of time, then AI and machine algorithms may be used by the control circuitry 204 to determine and allocate a time for the topic to be discussed in breakout room 2 (1030).

As depicted in FIG. 10, breakout room 1 was created and started at a 10-minute time marker (1010) of the primary conference session and breakout room 2 was created and started at a 20-minute time marker (1010) of the primary conference session. Although these exemplary starting times have been depicted, the starting times may vary and be at any time marker during the primary conference. For example, since some of the reasons for creating a breakout conference is to discuss a topic of disagreement or to discuss a topic that needs additional time, the control circuitry 204, through use of AI and NLP algorithms, may start a breakout session at any time during the primary conference when it detects a disagreement or an indication requiring additional time for discussing a topic of the agenda in the primary conference session 1000.

At the end of the 30 minutes allocated time for breakout room 1(1020) the participants of the breakout room may automatically and seamlessly be integrated back into the primary conference. For example, if the breakout session in breakout room 1 (1020) ends on time, i.e., at the end of its 30-minte allocated time, then the participants will be integrated back into the primary conference 1000 at time marker 30 minutes. In some embodiments, an option may be presented for the participants of the breakout room 2 (1030) to extend the time for breakout session or allow the automatic movement of the participants back into the primary conference session 1000.

As depicted, breakout conference 2 (1030) includes multiple trackers 1040 and 1050. In some embodiments, tracker 1040 may allow the participants of the breakout room 2 (1030) to monitor the progress of the primary conference without having to leave breakout room 2 (1030). In some embodiments, tracker 1050 may allow the participants of breakout room 2 (1030) to monitor their own progress, i.e., in terms of amount of time used and remaining, based on the total amount of time allocated for breakout room 2 (1030).

Additional meeting management and communication tools 1100, as depicted in FIG. 11, may be provided to participants of breakout room 2 (1050). For example, the participants of breakout room 2 (1050) may allow the control circuitry 204 to automatically and periodically report the progress of breakout room 2 to the participants of the primary conference 1000. If the progress reporting of breakout room 2 (1050) is activated, then, for example, a tracker 1050 may be depicted to the participants of the primary conference 1000.

FIG. 11 is an exemplary template of management and communication tools offered for selection to participants of either the breakout rooms or the primary conference, in accordance with some embodiments of the disclosure.

In some embodiments, the control circuitry may offer for selection, any one or more of the management tools 1100 to the participants for selection. In response to a selection made by a participant of the respective session, the control circuitry may automatically activate the meeting tool and perform actions related to the selection.

In some embodiments, the control circuitry may provide for selection, the following management and communication tools 1100: record primary or breakout conference session 1110, summarize primary or breakout conference 1120, communicate with participants from the primary or breakout conference 1130, track progress of the primary or breakout conference 1140, receive alerts from the primary or breakout conference 1150, activate timer for the primary or breakout conference 1160, add a new participant to the breakout conference 1170, and send automated updates from the breakout conference to the primary conference 1180, where updates may include decisions made in the breakout conference, summary of sub-topics, within the allocated topic, discussed in the breakout conference, and progress of the breakout conference.

In some embodiments, the meeting tools allow the participants of either the primary or breakout conference to record 1110 their respective sessions. In this embodiment, the control circuitry 204 may provide the option to record the primary conference session such that participants in the breakout conference do not miss out on any topic or subtopic discussed in the primary conference. The control circuitry 204 may store the recording in a database and provide it for access either during or after the end of the primary conference.

In some embodiments, the meeting tools allow the participants of either the primary or breakout conference to summarize 1120 their respective sessions. In this embodiment, the primary or the breakout conference may be summarized using a natural language processing (NLP) algorithm. The participants may select the type and level of summarization desired. For example, rather than having to read the word-by-word transcript of the recording, the participants may choose to obtain just the bullet points of the topics and subtopics discussed. The AI algorithm may accordingly summarize the transcript based on the level and type of summary option selected and may use NLP and other tools for performing such summarizations.

In some embodiments, the meeting tools allow the participants of either the primary or breakout conference to communicate 1130 with attendees from the other conferences without having to leave their respective conference. In this embodiment, the control circuitry may allow the participants of the breakout conference to communicate with the participants either in the primary conference session or another breakout conference, such as participants in room 2 (1030) of FIG. 10 may participate with primary conference 1000 participants or with breakout room 1 (1020) participants. Likewise, primary conference 1000 attendees or breakout room 1 (1020) make communicate with breakout room 2 (1030) participants.

In some embodiments, the meeting tools allow the participants of either the primary or breakout conference to track progress 1140 of their own conference as well the other conferences without having to leave their respective sessions. As depicted in FIG. 10, the control circuitry 204 may cause a progress tracker 1050 to be depicted to the participants in the primary conference 1000 if they select to monitor the progress off a particular breakout room, such as break room 2 (1030). As depicted in FIG. 10, in one embodiment, the participants of the primary conference selected to track breakout room 2 (1030) and not track breaking room 1 (1020), and, as such, only the tracker for breakroom 2 is depicted in the primary conference 1000.

In some embodiments, the meeting tools allow the participants of either the primary or breakout conference to activate a timer 1150 for their own conference as well as track a timer for other conference without having to leave their respective sessions. The timer may allow participants of one conference to monitor the progress of another conference.

In some embodiments, the meeting tools allow the participants from the primary conference to receive alerts 1160 from the breakout conference(s) and allow the participants from the breakout conference to receive alerts 1160 from the primary conference or from another breakout conference without having to leave their respective conference. The control circuitry 204 may be configured to provide an alert from one conference to another conference, for example if a participant in another conference mentions a name of the participant that is currently in another conference. In this example, the participant whose name is mentioned may be alerted and notified such that they may respond to a question, or a comment related to them. Other alerts, such as a mention of a topic may also be configured such that a participant associated with that topic is alerted if the topic is brought up in another conference. For example, a participant who is currently in a breakout conference in breakout room 2 (1030) of FIG. 10 and is responsible for thermal testing may be alerted if either their name or the mention of thermal testing comes up in either the primary conference 1000 or in the breakout conference 1020. In such instances, the participant may be alerted and notified of the topic and subtopic being discussed, the context in which their name or topic was mentioned, and if there is a pending question relating to the participant or the topic thereby allowing the participant to answer a question or post a comment without having to leave their respective conference.

In some embodiments, the meeting tools allow the participants of either the primary conference or breakout conference to add a participant 1170 to their conference without having to separately contact a participant that was not originally part of the conference. In other embodiments, the meeting tools allow adding a participant from the primary conference to the breakout conference who was not originally moved to the breakout conference.

When adding a participant that was not originally part of either the primary of breakout conference, the control circuitry 204 may automatically contact and add the needed participant to a conference where their input is needed or ask for their approval prior to being added.

In some embodiments, the meeting tools allow the participants from the primary conference to receive automated updates 1180 from the breakout conference(s) without having to leave the primary conference. These updates may include details related to decisions made, summary of sub-topics discussed, and the progress of the breakout conference.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising:
   establishing a primary conference call between a plurality of client devices;
   receiving a first voice input from a first client device and a second voice input from a second client device, from the plurality of client devices in the primary conference call;
   identifying one or more negations received from the second voice input, wherein the negation negates a statement made through the first voice input;
   determining whether the one or more negations received from the second voice input exceeds a predetermined threshold; and
   in response to determining that the one or more negations received from the second voice input exceeds a predetermined threshold:
   automatically generating a breakout conference, wherein the breakout conference is generated without a user input from any one of the pluralities of client devices; and
   automatically connecting the first and second client devices to the breakout conference.

2. The method of claim 1, further comprising:
   receiving a third voice input from a third client device and a fourth voice input from a fourth client device, from the plurality of client devices in the primary conference call;
   identifying a negation in the third voice input received from the third client device, wherein the negation negates a statement made through the fourth voice input;
   determining a degree associated with the negation received from the third voice input;
   in response to determining that degree of negation exceeds a predetermined degree and threshold:
   automatically generating a breakout conference, wherein the breakout conference is generated without a user input from any one of the pluralities of client devices; and
   automatically connecting the third and fourth client devices to the breakout conference.

3. The method of claim 2, wherein the predetermined degree threshold is associated with minor negation and determining that the negation received from the third voice input exceeds the predetermined degree threshold when the negation exceeds the minor negation degree threshold.

4. The method of claim 2, further comprising:
   determining that degree associated with the negation received from the third voice input is associated with a strong disagreement; and
   determining that the negation associated with strong disagreement exceeds the predetermined degree threshold.

5. The method of claim 1, wherein the predetermined threshold is associated with a predetermined number of negations and determining that the one or more negations received from the second voice input exceeds the predetermined threshold when a quantity of negations in the second voice input exceed the predetermined number of negations.

6. The method of claim 1, further comprising:
   allocating a time for the automatically generated breakout conference that includes the first and second client devices; and
   automatically integrating the first and second client devices back into the primary conference call at expiration of the allocated time.

7. The method of claim 6, further comprising, providing an audible alert to the first and second client devices while they are connected in the breakout conference, wherein the alert informs the first and second client devices that the breakout conference is about to end.

8. The method of claim 1, wherein breakout conference is generated for only those participants that have a disagreement with each other and are associated with the first and second client devices, from the plurality if client devices in the primary conference call.

9. The method of claim 1, wherein the breakout conference is conducted simultaneously while the primary conference call is in session.

10. The method of claim 1, further comprising:
    tracking progress of breakout conference; and
    providing the progress of the breakout conference to the plurality of devices that are joined into the primary conference call.

11. A system comprising:
    communication circuitry configured to access a plurality of client devices connected into a primary conference call; and
    control circuitry configured to:
    establish a primary conference call between a plurality of client devices;
    receive a first voice input from a first client device and a second voice input from a second client device, from the plurality of client devices in the primary conference call;
    identify one or more negations received from the second voice input, wherein the negation negates a statement made through the first voice input;
    determine whether the one or more negations received from the second voice input exceeds a predetermined threshold; and
    in response to determining that the one or more negations received from the second voice input exceeds a predetermined threshold:
    automatically generate a breakout conference, wherein the breakout conference is generated without a user input from any one of the pluralities of client devices; and
    automatically connect the first and second client devices to the breakout conference.

12. The system of claim 11, further comprising, the control circuitry configured to:
    receive a third voice input from a third client device and a fourth voice input from a fourth client device, from the plurality of client devices in the primary conference call;
    identify a negation in the third voice input received from the third client device, wherein the negation negates a statement made through the fourth voice input;
    determine a degree associated with the negation received from the third voice input; and
    in response to determining that degree of negation exceeds a predetermined degree threshold:

automatically generate a breakout conference, wherein the breakout conference is generated without a user input from any one of the pluralities of client devices; and automatically connect the third and fourth client devices to the breakout conference.

13. The system of claim 12, wherein the predetermined degree threshold is associated with minor negation and determining that the negation received from the third voice input exceeds the predetermined degree threshold when the negation exceeds the minor negation degree threshold.

14. The system of claim 12, further comprising, the control circuitry configured to:

determine that degree associated with the negation received from the third voice input is associated with a strong disagreement; and determine that the negation associated with strong disagreement exceeds the predetermined degree threshold.

15. The system of claim 11, wherein the predetermined threshold is associated with a predetermined number of negations and determining that the one or more negations received from the second voice input exceeds the predetermined threshold when a quantity of negations in the second voice input exceed the predetermined number of negations.

16. The system of claim 11, further comprising, the control circuitry configured to:

allocate a time for the automatically generated breakout conference that includes the first and second client devices; and automatically integrate the first and second client devices back into the primary conference call at expiration of the allocated time.

17. The system of claim 16, further comprising, the control circuitry configured to provide an audible alert to the first and second client devices while they are connected in the breakout conference, wherein the alert informs the first and second client devices that the breakout conference is about to end.

18. The system of claim 11, wherein breakout conference is generated for only those participants that have a disagreement with each other and are associated with the first and second client devices, from the plurality if client devices in the primary conference call.

19. The system of claim 11, wherein the breakout conference is conducted simultaneously while the primary conference call is in session.

20. The system of claim 11, further comprising, the control circuitry configured to:

track progress of breakout conference; and provide the progress of the breakout conference to the plurality of devices that are joined into the primary conference call.

* * * * *